(12) United States Patent
Yoshizawa et al.

(10) Patent No.: US 7,922,860 B2
(45) Date of Patent: Apr. 12, 2011

(54) MANUFACTURING INKJET HEAD BY ADHERING WITH EPOXY RESINS AND ALKYL IMIDAZOLE

(75) Inventors: Tomomi Yoshizawa, Hino (JP); Hiroyuki Nomori, Nishitokyo (JP); Sadatoshi Nishibuchi, Hino (JP); Hajime Tanisho, Higashiosaka (JP)

(73) Assignees: Konica Minolta Holdings, Inc., Tokyo (JP); Hanna Chemical Industry Co., Ltd., Higashiosaka-shi (JP)

( * ) Notice: Subject to any disclaimer, the term of this patent is extended or adjusted under 35 U.S.C. 154(b) by 0 days.

(21) Appl. No.: 12/584,616

(22) Filed: Sep. 9, 2009

(65) Prior Publication Data

US 2010/0018647 A1  Jan. 28, 2010

Related U.S. Application Data

(63) Continuation of application No. 11/384,091, filed on Mar. 17, 2006, now abandoned.

(30) Foreign Application Priority Data

| Mar. 18, 2005 | (JP) | 2005-079552 |
| Mar. 18, 2005 | (JP) | 2005-079570 |
| Dec. 1, 2005 | (JP) | 2005-347811 |
| Dec. 19, 2005 | (JP) | 2005-364691 |
| Feb. 14, 2006 | (JP) | 2006-036571 |

(51) Int. Cl.
*B41J 2/015* (2006.01)
*C09J 163/00* (2006.01)
*C09J 163/02* (2006.01)
*C09J 163/04* (2006.01)

(52) U.S. Cl. .......................................... 156/330; 347/20
(58) Field of Classification Search ........................ None
See application file for complete search history.

(56) References Cited

U.S. PATENT DOCUMENTS

| 4,900,848 A | 2/1990 | Saito et al. | |
| 7,360,867 B2 * | 4/2008 | Nomori et al. | 347/40 |
| 2003/0036587 A1 | 2/2003 | Kozak | |

FOREIGN PATENT DOCUMENTS

| JP | 6-271649 A | * | 9/1994 |
| JP | 9-100456 A | * | 4/1997 |
| JP | 2000-68294 A | * | 3/2000 |
| JP | 2001-301160 A | | 10/2001 |
| JP | 2001-301178 A | | 10/2001 |
| JP | 2002-294199 A | * | 10/2002 |
| JP | 2002-302591 A | * | 10/2002 |
| JP | 2003-266708 A | | 9/2003 |

* cited by examiner

*Primary Examiner* — Robert Sellers
(74) *Attorney, Agent, or Firm* — Holtz, Holtz, Goodman & Chick, P.C.

(57) ABSTRACT

Disclosed are an adhesive agent composition which has high chemical resistance and solvent resistance and is curable at around room temperature, an inkjet head which has good durability and jetting performance even in the case of using solvent ink, and a manufacturing method of the inkjet head. For these characteristics, the adhesive agent composition contains, as an activator, an imidazole derivative in which an alkyl group or a substituted alkyl group is substituted at the 1-postion or at the 1- and 2-positions, and as a base, a compound having three or more epoxy groups.

3 Claims, 9 Drawing Sheets

FIG2
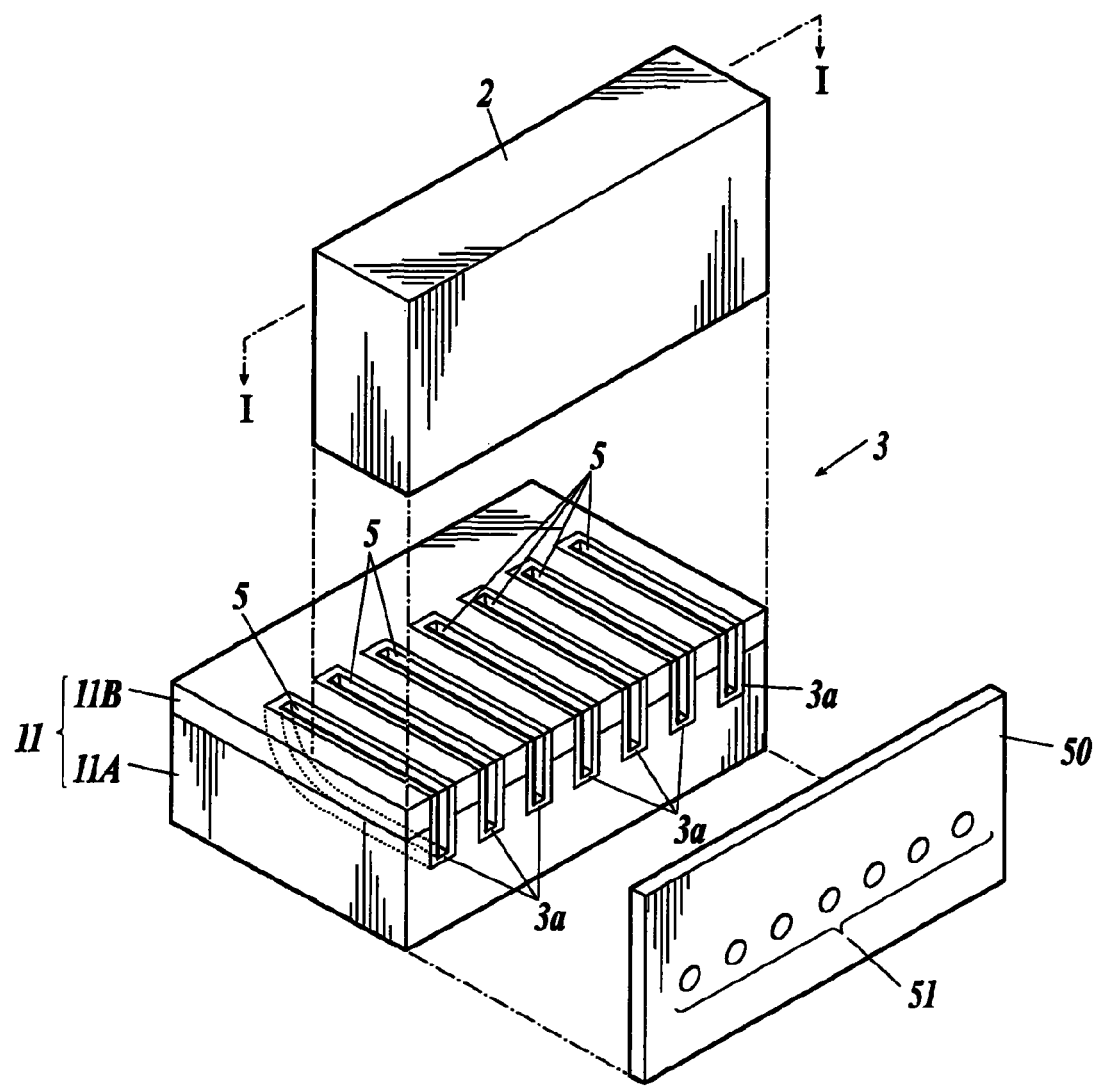
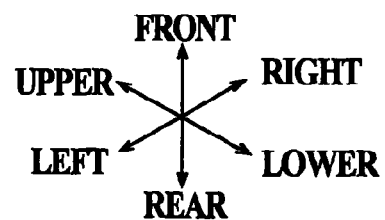

FIG3
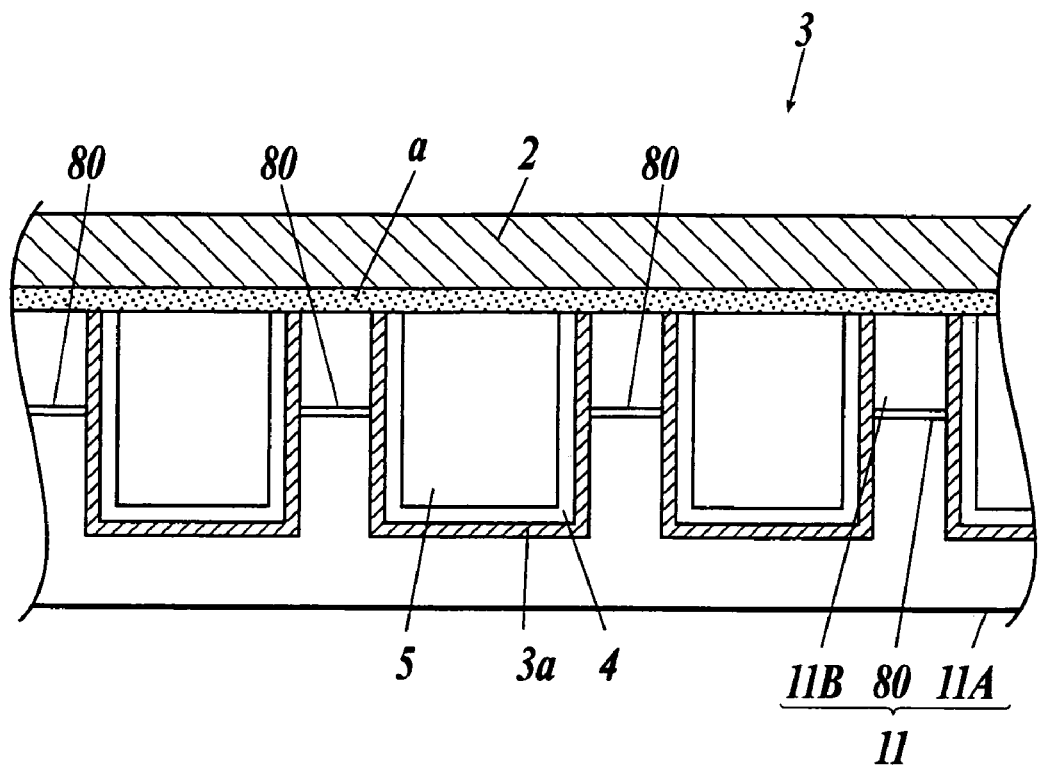
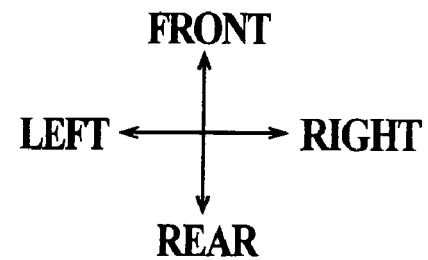

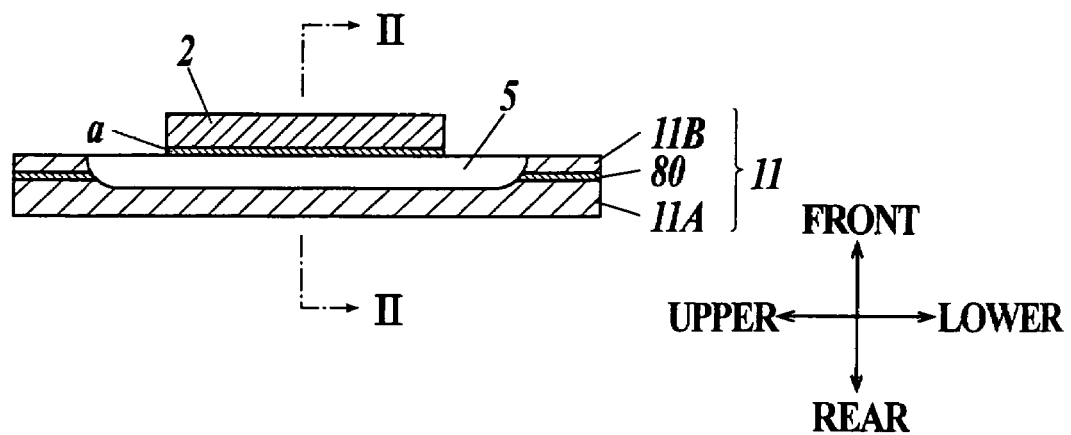
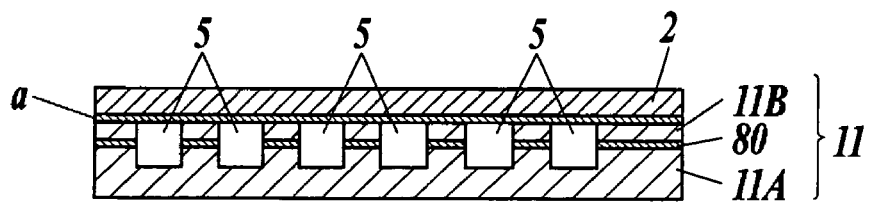

MANUFACTURING INKJET HEAD BY ADHERING WITH EPOXY RESINS AND ALKYL IMIDAZOLE

This application is a continuation of application Ser. No. 11/384,091 filed Mar. 17, 2006 (now abandoned), which is incorporated herein in its entirety by this reference.

BACKGROUND OF THE INVENTION

1. Field of the Invention

The present invention relates to an adhesive agent composition, an inkjet head fabricated by using the adhesive agent composition, and a manufacturing method of the same.

2. Description of Related Art

At present, a screen printing method is used for manufacturing a color filter of a liquid crystal display, coating an orientation film of the liquid crystal display, manufacturing various electronic precision parts such as an organic EL display, and so on. Moreover, a billboard is printed on a vinyl chloride sheet by the screen printing method. As described above, in general, the printing for commercial use is performed by the screen printing method.

Here, the screen printing method is a method which forms a desired printing pattern on a meshed screen, and prints, on a medium, ink passing through the pattern. The screen must be designed and manufactured before the printing, which has led to an increase of manufacturing steps and manufacturing cost. Moreover, there has been a problem that, every time when the pattern is changed, the screen must be remade so as to correspond to the changed pattern. Furthermore, since the screen is made of a stainless steel mesh and the like, there has also been a problem that a micro pattern cannot be manufactured.

Accordingly, in recent years, an inkjet recording method has come to be used in place of the conventional screen printing method since the inkjet recording method has been able to print ultra-micro ink droplets on an arbitrary place owing to a progress of an inkjet recording apparatus. The printing by the inkjet recording apparatus has advantages in that the pattern is not necessary unlike the printing by the conventional screen printing method, that it is possible to perform more micro printing than the screen printing method, that the apparatus is inexpensive, and so on.

An inkjet head for use in the inkjet recording apparatus includes one of a thermal mode of foaming the ink by providing a heater for ink passages, followed by jetting, and one of a piezoelectric mode of pressurizing the ink by piezoelectric elements provided in the ink passages. The ink for use in the thermal mode is limited to aqueous ink since organic solvent ink and oil-base ink do not foam. As opposed to this, the piezoelectric mode can jet any of the aqueous, solvent-base and the oil-base inks, and accordingly, is preferable.

The piezoelectric mode includes a mode of deforming a pressurization chamber by expansion and contraction of the piezoelectric elements, which are caused when an electric field is applied to the piezoelectric elements in a polarization direction, and a mode of deforming the pressurization chamber by shear deformation caused when the electric field is applied to the piezoelectric elements in a direction perpendicular to the polarization direction. The mode using the shear deformation includes a mode in which two wall surfaces of the pressurization chamber are composed of the piezoelectric elements, and a mode in which only one surface thereof is composed of the piezoelectric element.

In the inkjet head as described above, the ink passages are formed so as to contact with the piezoelectric elements, an inner capacity of each ink passage is varied following deformations of the piezoelectric elements, and the ink droplets are jetted. To the ink passages, various members such as a nozzle plate in which a cap member and nozzle holes are provided are adhered.

In general, the ink for use in the inkjet recording apparatus includes the aqueous ink and the solvent ink. The aqueous ink is ink made of water, a pigment, a water-soluble organic solvent, and an activator. The water-soluble organic solvent is glycol ether, which prevents evaporation of moisture from ink jetting ports during a pause of the jetting. Meanwhile, the solvent ink is one using a strong solvent for dissolution of resin. By using such a solvent, the solvent ink permeates through a recording medium after recording an image, and durability thereof is enhanced. Accordingly, the solvent ink is used for the printing for commercial use, which takes the durability as important.

In the inkjet recording method as an alternative to the screen printing method, various solvent inks including the oil-base ink, UV curing ink, and the like are used, and there is a possibility that the solvent for use in these inks swells or dissolves an adhesive agent of the inkjet head. As such a solvent, for example, there are used n-methylpyrrolidone, dimethylformamide, 2-pyrrolidinone, ethyl acetate, diethylene glycol monoethyl ether acetate, cyclohexanone, butoxyethyl acetate, and the like.

However, an adhesive agent composition usable with high reliability even in the extremely strong organic solvent for the dissolution of the resins has been unknown yet.

At the time of adhering the respective members to one another in a manufacturing process of the inkjet head, it is preferable that temperature at which the inkjet head is heated be low, and ideally, it is desirable that the temperature be room temperature. The adhesion at the low temperature makes it possible to prevent depolarization of the piezoelectric elements and to reduce a stress caused by a difference in linear thermal expansion coefficient among the members adhered to one another. When members largely different in linear thermal expansion coefficient from one another are adhered together by heat curing, there occur exfoliation, breakage, and the like in adhered portions owing to the stress when the members are returned to a room temperature atmosphere.

As examples of the adhesive agent having solvent resistance to the solvent ink, the following are mentioned. An adhesive agent described in JP 2001-301160A or JP 2001-301178A is an amine curing epoxy adhesive agent in which a mass increase is 5% or less in the case of being immersed in oil-base ink containing saturated hydrocarbon with the carbon number of 15 to 18 or monovalent alcohol with the carbon number of 15 to 18. In JP 2002-302591A, an adhesive agent formed of epoxy resin cured at 60° C. by using an amine curing resin is disclosed.

As examples of a curing method of the adhesive agent, which enhances the solvent resistance, the following are mentioned. In JP 2003-266708A, there is disclosed a method which, when the epoxy resin is cured by a dicyandiamide activator, slows down a temperature increase rate in a temperature range from the room temperature to 100° C., and enhances a crosslink density, thereby improving the solvent resistant. In JP 2000-68294A, there is disclosed a method which cures polyfunctional epoxy resin together with denatured imidazole at 150° C. for one minute, and assembles an electronic device.

However, in the adhesive agent composition described in JP 2001-301160A or JP 2001-301178A, resistance thereof to the solvent ink has been insufficient. Also in the adhesive agent composition described in JP 2002-302591A, though alkali resistance thereof is excellent, there has been a problem that resistance thereof to solvent ink containing a resin solvent is low. In the curing method of an adhesive agent, which is described in JP 2003-266708A, since a high curing temperature is required, there has been a problem that, when the members different from each other in thermal expansion coefficient are adhered together, there occurs warpage, breakage, and reduction of jetting performance owing to the stress caused by the above-described adhesion. In the curing method of an adhesive agent, which is described in JP 2000-68294A, since the curing temperature is too high, resulting in an occurrence of the depolarization of the piezoelectric elements, there has been a problem that the method concerned cannot be applied to the inkjet head using the piezoelectric elements.

In general, as the adhesive agent having the large solvent resistance, the epoxy adhesive agent is mentioned as described above. It is known that the property of the epoxy adhesive agent is varied depending on the activator to be used together therewith. As an activator which performs the curing at a relatively low temperature from the room temperature to approximately 60° C., there are known aliphatic polyamine, and alicyclic polyamine and polyamide. However, when the epoxy resin is cured by such an amine activator at the room temperature, there are disadvantages in that polar groups are created therebetween and that the cured epoxy resin is weak for the water and the solvent because a crosslink distance therebetween is long. The epoxy adhesive agent cured at the room temperature is usable in a temperature range from the room temperature to an intermediate temperature by heating as long as the aqueous ink is used. However since the solvent resistance of the epoxy adhesive agent is insufficient, the epoxy adhesive agent is prone to cause an ink leakage during use.

A description will be made of the curing of the epoxy adhesive agent by the amine activator. Since primary amine present in the amine activator has high activity, the primary amine opens a ring of an epoxy group and adds to the epoxy resin, thereby generating a secondary amine and a hydroxyl group. Such generation is repeated, and chains grown into a linear shape. When the secondary amine reacts with the epoxy group, a tertiary amine and a hydroxyl group are generated. Such generation is repeated, and a three-dimensional structure is thus formed. However, the amine activator is captured in such a crosslink structure, and the crosslink structure contains the hydroxyl group, and accordingly, the crosslink structure is prone to swell by absorbing the solvent. Although the amine activator and the hydroxyl group which remain in the three-dimensional structure should be reacted with the epoxy group remaining therein, the crosslink structure has already been formed at this point of time, and a glass transition point thereof is high, and accordingly, these groups cannot be brought into contact with one another to make the reaction unless heating is performed up to a glass transition temperature or more. Therefore, heating up to 150 to 200° C. or more is required, thereby deteriorating the polarization of the piezoelectric elements.

In the case of using the imidazoles as the activator, an adhesive agent having large resistance can be obtained. However, heating up to approximately 150° C. is required for the curing in the conventional technology. Since the imidazoles contain the secondary amine and the tertiary amine, the activity thereof is somewhat inferior to the activator containing the primary amine, the imidazoles make the reaction slowly at the room temperature, and the heating up to approximately 150° C. is required. However, a curing reaction mechanism of the activator of the imidazoles is different from that of the primary amine, the imidazoles act as a catalyst which starts the curing reaction, and when the curing reaction is started, the epoxy resin is crosslinked with the other by ether bonding. Accordingly, the polar groups are not contained in the cured body, and the distance between the crosslink points is short. Therefore, the imidazoles are excellent in solvent resistance. Moreover, since the primary amine has high activity, the primary amine causes a rash and an itch upon touching the human skin; however, the imidazoles do not cause the rash and the itch.

Typically, the structure of the cured object cured by the primary amine contains the hydroxyl group and amino bonding, and meanwhile, when the curing is performed by the imidazoles, only ether bonding is contained. Carbon-carbon bonding constituting a benzene ring and a methyl group has the highest chemical resistance, and the ether bonding follows the above. The ether bonding has characteristics that it is difficult to be swelled and dissolved by the organic solvent.

As described above, in the case of using the imidazoles as the activator, an adhesive agent layer excellent in solvent resistance is formed. However, the heating up to approximately 150° C. is required for the curing in the conventional technology, and it has been difficult to use the imidazoles for manufacturing the piezoelectric type inkjet head because of the reason of the difference in thermal expansion, which is described above.

Moreover, in the inkjet head used in recent years, a density of the nozzle holes on the nozzle plate is highly densified to 180 to 600 dpi (which represents the number of dots per inch, that is, per 2.54 cm). Accordingly, the inkjet head is formed so that an interval between the respective ink passages can be as extremely narrow as 40 to 70 µm. Moreover, the inkjet head is formed so that the number of ink passages can be as extremely large as 100 to 1000 in the case of a serial head and as 1000 to 8000 in the case of a line head. Specifically, there are several thousands of micro adhesion spots with a width of approximately 40 to 70 µm in one inkjet head, and adhesion positions thereof are prone to be misaligned owing to a difference in thermal expansion between the nozzle plate and a channel base. Accordingly, the adhesion of the nozzle plate is the most difficult technology in the manufacture of the inkjet head.

In this connection, when the adhesive agent is heated and cured in the case of manufacturing the inkjet head, the lower the temperature for the heating is, the more preferable it is. Ideally, it is desirable that the adhesive agent be cured at the room temperature. The reason of this is in order to prevent the depolarization of the piezoelectric elements and in order to prevent the warpage, the breakage, and the reduction of the jetting performance owing to the difference in linear thermal expansion coefficient.

The depolarization of the piezoelectric elements is a phenomenon that piezoelectric property thereof is lost when the piezoelectric elements are heated up to a high temperature. Since the piezoelectric elements have such characteristics, there has been a problem that the piezoelectric elements cannot be heated up to 100 to 150° C. or more.

SUMMARY OF THE INVENTION

The present invention has been made in consideration of the above-described circumstances. It is one of objects of the present invention to provide an inkjet head which has high chemical resistance and solvent resistance, and is good in durability and jetting performance even in the case of using an adhesive agent composition curable at the room temperature to a moderate temperature and solvent ink, and to provide a manufacturing method of the inkjet head.

In order to achieve the above-described object, according to a first aspect of the invention, a method of manufacturing an inkjet head comprises: adhering members constituting the inkjet head together by using an adhesive agent composition, wherein the adhesive agent composition contains, as an activator, an imidazole derivative in which an alkyl group or a substituted alkyl group is substituted at the 1-postion or at the 1- and 2-positions, contains a compound having three or more epoxy groups as a base, and is cured at 60° C. or less, thereby adhering the members together.

As described above, the adhesive agent composition using the activator which contains the imidazole derivative in which the alkyl group or the substituted alkyl group is substituted at the 1-position or at the 1-and 2-positions is cured at 60° C. or less, and the members are thus adhered together, thereby manufacturing the inkjet head. Thus, even if the adhesive agent which has high chemical resistance and solvent resistance and is curable at low temperature and the solvent ink are used, an inkjet head which has good durability and jetting performance can be provided.

Preferably, a difference in linear thermal expansion coefficient between the members is 12 ppm/K or more.

Preferably, the adhesive agent composition contacts ink after being cured.

Preferably, the adhesive agent composition further contains bisphenol A type epoxy resin or bisphenol F type epoxy resin as a compound having two epoxy groups.

Preferably, in the adhesive agent composition, an epoxy equivalent of the compound having three or more epoxy groups is 120 or less.

Preferably, in the adhesive agent composition, the compound having three or more epoxy groups is a compound represented by a following general formula (1):

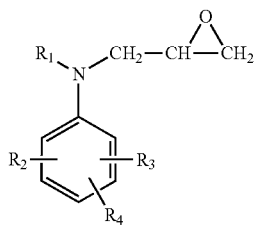

(1)

where $R_1$ to $R_3$ are hydrogen, an alkyl group, or a substituted alkyl group, and $R_4$ is hydrogen, an alkyl group, an alkoxy group, alkyl amino group, substituted alkyl amino group or a substituted alkoxy group.

Preferably, in the adhesive agent composition, the compound having three or more epoxy groups is a compound represented by a following general formula (2):

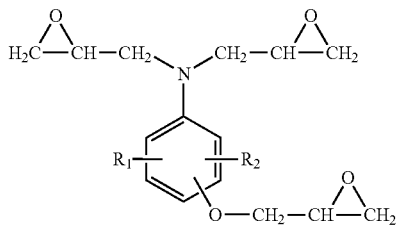

(2)

where $R_1$ and $R_2$ are hydrogen, an alkyl group, or a substituted alkyl group.

Preferably, the compound having two epoxy groups is bisphenol F type epoxy resin, in the base, the compound having two epoxy groups is contained by 20 to 90% by mass, and the compound having three epoxy groups is contained by 10 to 80% by mass, and 6 parts by mass or more of the activator is mixed with respect to 100 parts by mass of the base.

Preferably, the base further contains a compound having two epoxy groups, the compound having two epoxy groups is contained by 20 to 90% by mass in the base, and the compound having three or more epoxy groups is contained by 10 to 80%-by mass in the base, 6 parts by mass or more of the activator is mixed with respect to 100 parts by mass of the base, and at least one of microparticles of resin, a silane coupling agent, and zirconate is added to the adhesive agent composition.

According to a second aspect of the invention, an adhesive agent composition, comprises: as an activator, an imidazole derivative in which an alkyl group or a substituted alkyl group is substituted at the 1-postion or at the 1- and 2-positions; and as a base, a compound having three or more epoxy groups.

As described above, the adhesive agent composition using the activator which contains the imidazole derivative in which the alkyl group or the substituted alkyl group is substituted at the 1-position or at the 1-and 2-positions is prepared. Thus, even if the adhesive agent which has high chemical resistance and solvent resistance and is curable at low temperature and the solvent ink are used, an inkjet head which has good durability and jetting performance can be provided.

Preferably, the adhesive agent composition further comprises: bisphenol A type epoxy resin or bisphenol F type epoxy resin as a compound having two epoxy groups.

Preferably, an epoxy equivalent of the compound having three or more epoxy groups is 120 or less.

Preferably, the compound having three or more epoxy groups is a compound represented by a following general formula (1):

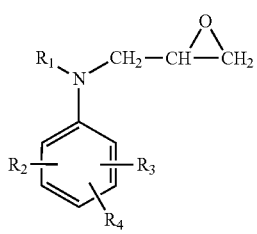

(1)

where $R_1$ to $R_3$ are hydrogen, an alkyl group, or a substituted alkyl group, and $R_4$ is hydrogen, an alkyl group, an alkoxy group, alkyl amino group, substituted alkyl amino group or a substituted alkoxy group.

Preferably, the compound having three or more epoxy groups is a compound represented by a following general formula (2):

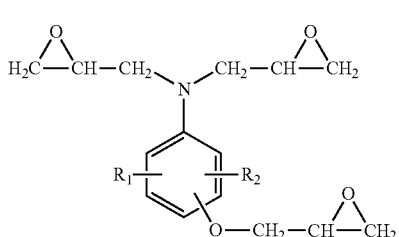

(2)

where $R_1$ and $R_2$ are hydrogen, an alkyl group, or a substituted alkyl group.

Preferably, the compound having two epoxy groups is bisphenol F type epoxy resin, in the base, the compound having two epoxy groups is contained by 20 to 90 percents by mass, and the compound having three epoxy groups is contained by 10 to 80 percents by mass, and 6 parts by mass or more of the activator is mixed with respect to 100 parts by mass of the base.

Preferably, the base further contains a compound having two epoxy groups, the compound having two epoxy groups is contained by 20 to 90 percents by mass in the base, and the compound having three or more epoxy groups is contained by 10 to 80 percents by mass in the base, 6 parts by mass or more of the activator is mixed with respect to 100 parts by mass of the base, and at least one of microparticles of resin, a silane coupling agent, and zirconate is added to the adhesive agent composition.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein;

FIG. 2 is an exploded perspective view of an ink chamber in the first embodiment of the present invention;

FIG. 3 is a cross-sectional view along a line I-I of FIG. 1 and FIG. 2;

FIGS. 4A and 4B are explanatory views of a manufacturing method of an inkjet head in the first embodiment of the present invention, in which FIG. 4A is a cross-sectional view showing a state where two piezoelectric ceramic bases and a cap member are adhered together, and FIG. 4B is a cross-sectional view along a line II-II of FIG. 4A;

DETAILED DESCRIPTION OF THE INVENTION

First Embodiment

Figure 1:
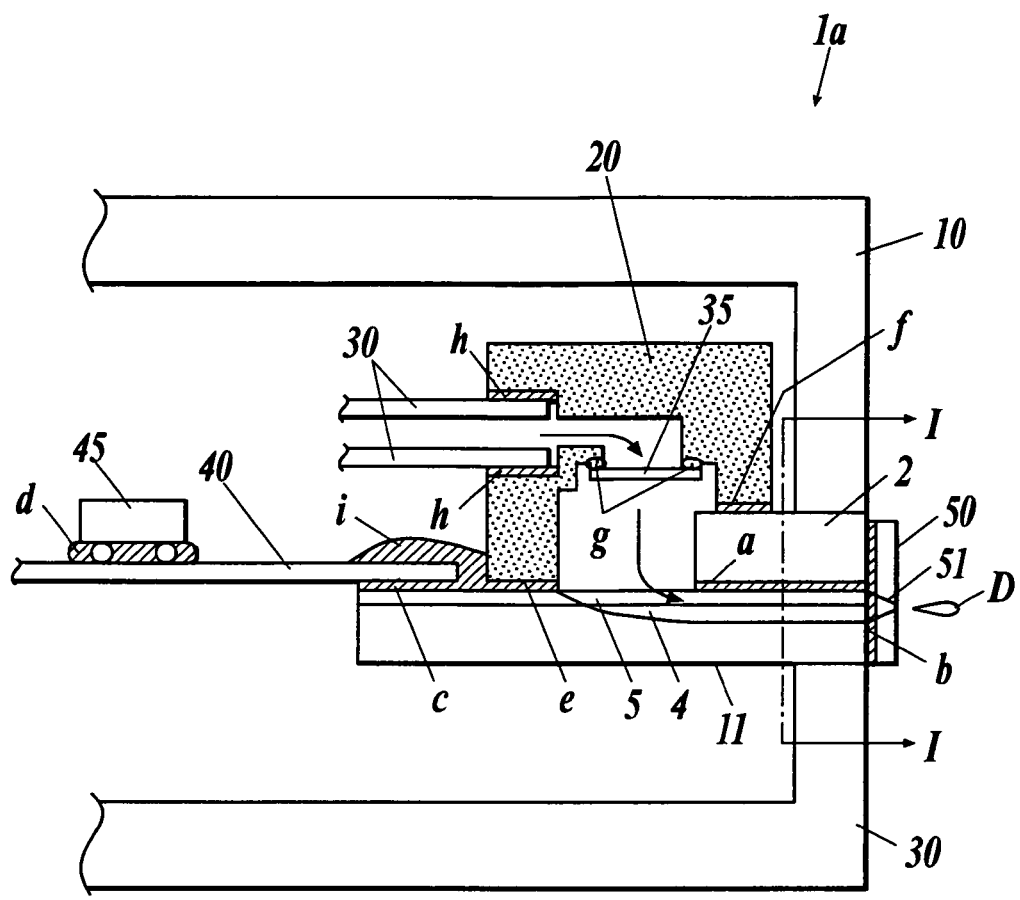
FIG. 1 is a longitudinal cross-sectional view of an inkjet head in a first embodiment of the present invention.

First, a description will be made of an embodiment of an adhesive agent composition according to the present invention.

The adhesive agent composition according to the present invention is an adhesive agent composition containing, as an activator, an imidazole derivative in which an alkyl group or a substituted alkyl group is substituted at the 1-postion or at the 1- and 2-positions, and as a base, a compound having three or more epoxy groups.

As the alkyl group, an alkyl group with a carbon number of 1 to 20 is mentioned. Specifically, there are mentioned branched and straight-chain alkyl groups such as a methyl group, an ethyl group, an isopropyl group, a t-butyl group, a hexyl group, a dodecyl group, and a pentadecyl group, and cyclo alkyl groups such as a cyclopentyl group and a cyclohexyl group. These may be substituted alkyl groups having substituent groups. As the substituent groups, there are mentioned an alkyl group, an alkenyl group, an aryl group, a heterocycle group, a halogen atom, an alkoxy group, an aryloxy group, an alkoxy carbonyl group, an aryloxy carbonyl group, a sulfonamide group, a sulfamoyl group, a ureide group, an acyl group, an acyloxy group, a carbamoyl group, an alkyl sulfonyl group, an aryl sulfonyl group, a cyano group, a nitro group, a sulfo group, a hydroxyl group, and the like.

Moreover, in the imidazole derivative in which the alkyl group or the substituted alkyl group is substituted at the 1-position, the substituent group may be provided at a position other than the 1-position. In the imidazole derivative in which the alkyl groups or the substituted alkyl groups are substituted for the 1- and 2-positions, the substituent group may be provided at a position other than the 1- and 2-positions. As the substituent group, the ones mentioned as the substituent group of the substituted alkyl group are applicable.

As the imidazole derivative in which the alkyl group or the substituted alkyl group is substituted at the 1-position or at the 1- and 2-positions, specifically, there are mentioned 1-methylimidazole, 1-benzyl-2-methylimidazole, 1-benzyl-2-phenylimidazole, 1,2-dimethylimidazole, 1-isobutyl-2-methylimidazole, 1-methyl-2-ethylimidazole, 1-ethylimidazole, 1-cyanoethyl-2-ethyl-4-methylimidazole, 1-cyanoethyl-2-methylimidazole, 1-(2-hydroxy-3-phenoxypropyl)-2-ethyl-4-methylimidazole, 1-(2-hydroxy-3-phenoxypropyl)-2-methylimidazole, and the like.

As the activator, in addition to the imidazole derivative in which the alkyl group or the substituted alkyl group is substituted at the 1-position or at the 1- and 2-positions, hexahydro phthalic anhydride, diethylene triamine, triethylene tetraamine, and polyamide may be used. Moreover, an aliphatic amine series, an aromatic amine series, and the like may be used in combination.

Here, with regard to the imidazole derivative in which the alkyl group or the substituted alkyl group is substituted at the 1-position or the 1- and 2-positions, as an additional amount thereof with respect to 100 parts by mass of the compound having the epoxy groups, 6 parts by mass or more is preferable, and 6 to 15 parts by mass is more preferable.

As the compound having three or more epoxy groups, specifically, there are mentioned triglycidyl-p-aminophenol (92.3), tetraglycidyl diaminodiphenyl methane (105.5), triglycidyl isocyanurate (99), triglycidyl urazole (89.7), triglycidyl aminocresol (97), tetraglycidyl-1,3-diaminomethylcyclohexane (91.5), and glycerol triglycidyl ether (86.7). Note that numeric values in the parentheses represent epoxy equivalents of the respective compounds. Here, the epoxy equivalents are values obtained by dividing molecular weights of the epoxy resins by the number of epoxy groups. The smaller each of the values is, the shorter the distance between the crosslink points becomes.

Moreover, as the compound having three or more epoxy groups, novolac epoxy resin may be used. As the novolac epoxy resin, phenol novolac type epoxy resin and cresol novolac type epoxy resin are applicable. As specific examples of the phenol novolac type epoxy resin, there are mentioned EPPN 201 (prepared by Nippon Kayaku Co., Ltd.), EPPN202 (prepared by Nippon Kayaku Co., Ltd.), EPIKOTE 152 (prepared by Japan Epoxy Resins Co., Ltd.), EPIKOTE 154 (prepared by Japan Epoxy Resins Co., Ltd.), DEN-438 (prepared by The Dow Chemical Company), and the like. As specific examples of the cresol novolac type epoxy resin, there are mentioned EOCN 102 (prepared by Nippon Kayaku Co., Ltd.), EOCN 103S (prepared by Nippon Kayaku Co., Ltd.), EOCN 104S (prepared by Nippon Kayaku Co., Ltd.), EOCN 1020 (prepared by Nippon Kayaku Co., Ltd.), EOCN 1025 (prepared by Nippon Kayaku Co., Ltd.), EOCN 1027 (prepared by Nippon Kayaku Co., Ltd.), EPIKOTE 180S (prepared by Japan Epoxy Resins Co., Ltd.), and the like.

Furthermore, as the compound having three or more epoxy groups, one described in JP 2002-210985A is mentioned. Here, as the compound having three or more epoxy groups, one with an epoxy equivalent of 120 or less is preferable, and one with an epoxy equivalent of 100 or less is more preferable.

As the compound having three or more epoxy groups, a preferable one is the compound represented by the above-described general formula (1). $R_1$ to $R_3$ in the general formula (1) denote a hydrogen atom, an alkyl group, or a substituted alkyl group. $R_4$ denotes a hydrogen atom, an alkyl group, an alkoxy group, or a substituted alkoxy group. Moreover, the sum of the epoxy groups owned by $R_1$ to $R_4$ is two or more. Although no particular limitations are imposed on the alkyl groups of $R_1$ to $R_4$, as examples thereof, there are mentioned a methyl group, an ethyl group, a propyl group, an isopropyl group, a t-butyl group, a pentyl group, an isopentyl group, and the like, of which carbon number is about 1 to 20. No particular limitations are imposed on the substituted alkyl group of $R_1$, and a glycidyl group, a benzyl group, and the like are mentioned as examples thereof. No particular limitations are imposed on the substituted alkyl groups of $R_2$ and $R_3$, and a benzyl group, a p-diglycidyl amino benzyl group, and the like are mentioned as examples thereof. No particular limitations are imposed on the alkoxy group of $R_4$, and a methoxy group, an ethoxy group, and the like are mentioned as examples thereof. No particular limitations are imposed on the substituted alkoxy group of $R_4$, and a glycidyl group and the like are mentioned as examples thereof.

Moreover, as the compound having three or more epoxy groups, a more preferable one is the compound represented by the above-described general formula (2). No particular limitations are imposed on the alkyl groups denoted by $R_1$ and $R_2$ in the general formula (2), and as examples thereof, there are mentioned branched and straight-chain alkyl groups such as a methyl group, an ethyl group, an isopropyl group, a t-butyl group, a hexyl group, a dodecyl group, and a pentadecyl group, and cyclo alkyl groups such as a cyclopentyl group and a cyclohexyl group. These may be substituted alkyl groups having substituent groups. As the substituent groups, there are mentioned an alkyl group, an alkenyl group, an aryl group, a heterocycle group, a halogen atom, an alkoxy group, an aryloxy group, an alkoxy carbonyl group, an aryloxy carbonyl group, a sulfonamide group, a sulfamoyl group, a ureide group, an acyl group, an acyloxy group, a carbamoyl group, an alkyl sulfonyl group, an aryl sulfonyl group, a cyano group, a nitro group, a sulfo group, a hydroxyl group, and the like.

A compound having two epoxy groups may be mixed to each of the above-described compounds each having three or more epoxy groups. It is preferable that an epoxy equivalent of the compound having two epoxy groups be 150 or less. As the compound having two epoxy groups, for example, there are mentioned bisphenol A type epoxy resin (184 to 194) (EPIKOTE 828: prepared by Japan Epoxy Resins Co., Ltd.), bisphenol F type epoxy resin (160 to 170) (EPIKOTE 806, EPIKOTE 807: prepared by Japan Epoxy Resins Co., Ltd.), RE303S-L (prepared by Nippon Kayaku Co., Ltd.), and further, one described in JP 2002-210985A). Among them, it is preferable to add the bisphenol F type epoxy resin from a viewpoint of enhancing the solvent resistance. Moreover, with regard to an additional amount of the compounds, the additional amount of the compound having three or more epoxy groups to 100 parts by mass of the compound having two epoxy groups is preferably 10 to 100 parts by mass, more preferably, 20 to 50 parts by mass.

As the base according to the present invention, any one of the compounds each having three or more epoxy groups and the compound having two epoxy groups are used in combination. Besides this, several kinds of the compounds each having three or more epoxy groups and the compound having two epoxy groups may be used in combination.

As a method of enhancing the crosslink density of the adhesive agent composition for enhancing the resistance thereof after the curing, methods of increasing the number of epoxy groups of the base are mentioned. As one of the methods, there is a method of using novolac epoxy resin having three or more epoxy groups as the base. However, the novolac epoxy resin has problems that fluidity of the novolac epoxy resin at the room temperature is low, that it is thus difficult to obtain sufficient adhesive force by the curing at the room temperature, and that sufficient solvent resistance cannot be obtained by the curing at a low temperature. However, the one with an epoxy equivalent of 120 or less, and further, of 100 or less is used as the compound having three or more epoxy groups, thus making it possible to improve the performance described above.

From the adhesive agent composition after the curing, an imidazole ring-containing compound and the compound having three or more epoxy resins are detected by a pyrolysis GC mass spectrum in a form from which the epoxy groups are desorbed. Moreover, the imidazole ring-containing compound is detected by a solid state NMR.

To the adhesive agent according to the present invention, microparticles of resin, a silane coupling agent, and zirconate may be added as an additive.

Particles of a copolymer of methyl methacrylate and butyl acrylate, and the like are applicable as the microparticles of resin.

As the silane coupling agent, there are applicable amino silane coupling agents such as γ-aminopropyl triethoxy silane, N-β-aminoethyl-γ-aminopropyl triethoxy silane, N-β-aminoethyl-γ-aminopropyl trimethoxy silane, N-β-aminoethyl-γ-aminopropyl methyl dimethoxy silance, N-phenyl-γ-aminopropyl trimethoxy silane, and γ-ureidepropyl triethoxy silane, and epoxy silane coupling agents such as γ-glycidoxy propyl trimethoxy silane, β-(3,4-epoxy cyclohexyl)ethyl trimethoxy silane, and γ-glycidoxy propyl methyl diethoxy silane.

Moreover, as the zirconate, there are applicable neopentyl (diallyl)oxytrineodecanoyl zirconate, neopentyl(diallyl)oxytri(dodecyl)benzene-sulfonyl zirconate, neopentyl(diallyl) oxy•tri(p-amino)benzoate•zirconate(LZ-37), tetrapropyl zirconate, tetrabutyl zirconate, tetra(ethanolamine)zirconate, tetraisopropyl zirconate, isopropyltri(n-aminoethyl-aminoethyl)zirconate, diisopropyldi(4-aminobenzoyl)zirconate, tris-2-propoxy(2-ethylamino)ethyl zirconate, tris[(2,2-bis2-propenyloxymethyl)butoxy]ethylene diaminoethoxy zirconate, and the like.

Moreover, an inorganic filler may be added to the adhesive agent composition of the present invention. As the inorganic filler, there are mentioned carbonates such as calcium carbonate and magnesium carbonate, sulfates such as barium sulfate and magnesium sulfate, silicates such as aluminum silicate and zirconium silicate, oxides such as iron oxide, titanium oxide, aluminum oxide and zinc oxide, kaolin, talc, asbestos powder, quartz powder, mica, glass fiber, and the like. However, the inorganic filler is not limited to these. Among them, it is preferable to use titanium oxide and silica singly or in combination of two or more thereof from various viewpoints.

In the case of using the inorganic filler, in order to couple inorganic microparticles and an organic material contained in the adhesive agent composition to each other, it is preferable to use the silane coupling agent and a titanium coupling agent as the coupling agent.

As specific examples of the silane coupling agent, the above-described ones are applicable.

As specific examples of the titanium coupling agent, for example, isopropyltri(N-aminoethyl-aminoethyl)titanate, dicumyl phenyloxy acetate titanate, diisostearoyl ethylene titanate, and the like can be mentioned. However, the titanium coupling agent is not limited thereto.

Additional amounts of these coupling agents are largely varied depending on the type of the adhesive agent composition of the present invention. However, it is preferable to set each additional amount at 5 parts by mass or less when the sum of the adhesive agent composition and the inorganic filler added thereto is 100 parts by mass. When the additional amount exceeds 5 parts by mass, cohesion force of the organic material is decreased, and as a result, the adhesive force and reliability of the adhesive agent composition are decreased.

Moreover, it is preferable to add 0.2 to 10% of microparticles with a mean particle diameter of 0.1 μm or less to the adhesive agent composition of the present invention, thereby increasing viscosity thereof, followed by the adhesion. As the resin microparticles with a mean particle diameter of 0.1 μm or less, specifically, AEROSIL R202 prepared by Nippon Aerosil Co., Ltd. is mentioned.

By using the adhesive agent composition in this embodiment, the curing from the normal temperature to 60° C. is made possible. In terms of the difference in linear thermal expansion coefficient between the adhered members, the adhesive agent composition is applicable within a range from 12 ppm/K to 100 ppm/K. Heretofore, an adverse effect owing to a stress, which will be described later, has occurred in the case where there is a difference in linear thermal expansion coefficient, which exceeds 12 ppm/K. However, according to the present invention, the adverse effect as described above does not occur, and it is possible to select and use the optimum materials from viewpoints of the performance and the processability.

Here, as the adhered members, ceramics, metal, resin, and the like are mentioned.

As the ceramics, for example, lead zirconate titanate (hereinafter, "PZT"), aluminum nitride, boron nitride, alumina, silica, and the like are mentioned. PZT is preferably used as the piezoelectric elements, and as specific examples thereof, PZT(PbZrO$_3$—PbTiO$_3$) and third component-added PZT are mentioned. As the third component to be added, BaTiO$_3$, ZnO, LiNbO$_3$, and LiTaO$_3$ are mentioned as well as Pb(Mn$_{1/3}$Sb$_{2/3}$)O$_3$, Pb(Co$_{1/3}$Nb$_{2/3}$)O$_3$, and the like.

As the metal, for example, aluminum, stainless steel, titanium, and the like are mentioned.

As the resin, for example, acrylic resin, polyetherimide, Nylon, polyethylene telephthalate, polyphenylene sulfide, polyether ether ketone, polyphenylene ether, polybutylene telephthalate, liquid crystal polymer, polycarbonate, and the like are mentioned.

Here, when there is a difference in linear thermal expansion coefficient, which exceeds 12 ppm/K, the linear thermal expansion coefficients of the adhered members largely differ from each other. Accordingly, contraction factors of the members when the members are cooled after being heated and cured differ from each other, causing a problem that exfoliation and breakage such as fracture occur owing to deflection caused in the adhered position.

Even if the members different in linear thermal expansion coefficient from each other are adhered together, such problem does not occur if the members are adhered together at approximately the room temperature. However, there was also a problem that the adhesive agent composition was not resistant to ink having strong corrosive property. Here, a description will be made more in detail of the problem at the time when the members different in linear thermal expansion coefficient are heated and adhered together.

The stress P owing to thermal contraction caused between the adhesive agent and the adhered member when the members are cooled down to the room temperature after being heated and cured is generally obtained by the following formula.

$$P \approx E \Delta \alpha (t_2 - t_1)$$

(where E: elastic modulus of adhesive agent; Δα: difference in linear thermal expansion coefficient; $t_2$: curing temperature; $t_1$: room temperature)

In general, while the linear thermal expansion coefficient of PZT is $2 \times 10^{-6}$=2 ppm/K, the linear thermal expansion coefficient of the resin member as the adhered member to which PZT is adhered is approximately $8 \times 10^{-5}$ to $2 \times 10^{-4}$ (80 to 200 ppm/K). Accordingly, for example, when PZT with a linear thermal expansion coefficient of 2 ppm/K and a resin member with a linear thermal expansion coefficient of 140 ppm/K are cured together at 100° C., PZT extends 15 μm, the resin member extends 1050 μm, and a dimensional shift of 1 mm occurs therebetween. In the case of an inkjet head with 1800 dpi, the interval between the ink passages is 70 μm, and accordingly, the dimensional shift of 1 mm largely affects the inkjet head.

Here, when the microparticle filler is added to the epoxy adhesive agent, the linear thermal expansion coefficient of the epoxy adhesive agent can be decreased in substantial proportion to the additional amount of the filler. For example, when the filler is added by 50 percents by mass to the epoxy adhesive agent, the linear thermal expansion coefficient of the epoxy adhesive agent can be made to coincide with the linear thermal expansion coefficient of PZT. However, in the inkjet head, since PZT and the resin member are adhered together by using the epoxy adhesive agent, even if the linear thermal expansion coefficients of PZT and the epoxy adhesive agent are made to coincide with each other, breakage occurs in the adhered portion if a difference in linear thermal expansion coefficient between the resin member and the epoxy adhesive agent is large.

In this case, it is also possible to decrease the linear thermal expansion coefficient of the resin member by adding the filler thereto. Therefore, as compared with the conventional case, the linear thermal expansion coefficients of the resin member and the epoxy adhesive agent are decreased, and the influence from the thermal contraction is reduced. It is preferable to decrease the curing temperature to the lowest possible value as well as to adopt the technologies described above. For example, when the curing temperature is decreased from 100° C. to 60° C., the influence from the thermal contraction can be decreased to half.

The filler is preferable since the filler not only decreases the linear thermal expansion coefficient of the resin member but also has a function to enhance the solvent resistance of the resin member. As the filler, silica and alumina are mentioned.

It is preferable that the additional amount of the filler be 30 to 50 percents by mass with respect to the resin.

Moreover, the inventors of the present invention found that, in the case of using the imidazole-series activator according to the present invention, the activator concerned is sufficiently resistant to such a strong resin solvent as being contained in screen printing ink. Thus, it is made possible to improve the enormous inkjet technologies developed heretofore, and to achieve application of the inkjet technology to the screen printing, which has been heretofore impossible or problematic.

Next, a description will be made of a structure of an inkjet head according to the present invention, to which the above-described adhesive agent composition is applied, with reference to the drawings. FIG. 1 is a longitudinal cross-sectional view of an inkjet head 1a. The inkjet head 1a is a piezoelectric type inkjet head according to this embodiment, and is formed so as to extend in a direction substantially perpendicular to FIG. 1. Here, as shown in FIG. 1, a direction substantially parallel to a recording medium and substantially perpendicular to the inkjet head 1a is defined as a fore and aft direction, a width direction of the inkjet head 1a is defined as a right and left direction, and a direction substantially perpendicular to the recording medium is defined as a vertical direction.

In the inkjet head 1a, a cover 10 which covers the entirety of the inkjet head 1a is provided. In the inside of the cover 10, an ink chamber 3 which jets ink droplets D by varying an inner capacity thereof is provided while protruding one end thereof from the cover 10. A lower surface of the ink chamber 3 is an adhesion surface, to which a flat nozzle plate 50 opposite to the recording medium is adhered. The nozzle plate 50 is adhered to the ink chamber 3 through an adhesion portion b, and the adhesion portion b is a region formed by the curing of the adhesive agent composition according to the present invention. In the nozzle plate 50, nozzle holes 51 which jet the ink droplets D are provided so as to be opposite to the ink chamber 3.

FIG. 2 is an exploded perspective view of the ink chamber 3, the nozzle plate 50, and a cap member 2 to be described later. FIG. 3 is a cross-sectional view along a line I-I of FIG. 1 and FIG. 2.

In the ink chamber 3, a piezoelectric ceramic base 11 serving as a base is provided. In the piezoelectric ceramic base 11, a piezoelectric element 11A serving as the base of the ink chamber 3 is provided. Onto a front surface of the piezoelectric element 11A, a piezoelectric element 11B polarized in a direction reverse to a polarization direction of the piezoelectric element 11A is pasted. The piezoelectric element 11A and the piezoelectric element 11B are adhered to each other through an adhesion portion 80, and the adhesion portion 80 is a region formed by the curing of the adhesive agent composition according to the present invention.

On a front surface of the piezoelectric ceramic base 11, plural ink passages 5 which extend in the vertical direction are formed at a predetermined interval in a width direction (right and left direction) of the inkjet head. As shown in FIG. 2, the ink passages 5 are formed so that a depth dimension thereof can be larger than that of the adhesion portion 80 of the piezoelectric ceramic base 11. Upper ends of the ink passages 5 are formed so as to form a substantially circular arc shape when viewed from the side. Onto front surfaces of the ink passages 5, electrode layers 3a to which a voltage based on image information is transmitted are pasted.

As shown in FIG. 1, an FPC 40 to which the image information is inputted is electrically connected to each upper end of the electrode layers 3a. In an adhered region of the electrode layer 3a and the FPC 40, an adhesion portion c formed of the adhesive agent composition according to the present invention is formed. The FPC 40 is adhered in a reinforced manner to the piezoelectric ceramic base 11 through an adhesion portion i. Onto a front surface of the FPC 40, a drive IC 45 which generates the voltage based on the image information inputted to the FPC 40 is adhered. On an adhered region of the drive IC 45, an adhesion portion d formed of the adhesive agent composition according to the present invention is formed.

In each inside of the electrode layers 3a, an ink passage 5 in which ink flows in a direction of an arrow shown in FIG. 1 is provided. As shown in FIGS. 1 to 3, each ink passage 5 is formed to be adapted to a shape of the ink passage 5, and a front surface of the ink chamber 3 is made substantially uniform. On a surface of each ink passage 5, a protection layer 4 as an outer layer for preventing damage of the electrode layer 3a owing to deformation is provided.

Onto the front surface of the ink chamber 3, the flat cap member 2 formed so that a length dimension thereof in the vertical direction can be made shorter than a length dimension of the ink passages 5 is adhered. The cap member 2 is formed of a flat plate made of, for example, glass, ceramics, metal, or plastics. Moreover, as shown in FIG. 3, an adhesion portion a formed of the adhesive agent composition according to the present invention is interposed between the ink chamber 3 and the cap member 2.

As shown in FIG. 1, onto a front surface of the cap member 2, a manifold 20 to be described later is adhered so as to coat openings of the ink passages 5. These are adhered together by using the adhesive agent composition according to the present invention. Between the cap member 2 and the manifold 20, an adhesion portion f is formed, and between the piezoelectric ceramic base 11 and the manifold 20, an adhesion portion e is formed.

In the manifold 20, an ink tube 30 is provided through an adhesion portion h. An ink reservoir portion (not shown) is coupled-to the ink tube 30, and the ink is supplied through the ink tube 30 to the manifold 20. In the inside of the manifold 20, a filter 35 which removes foreign objects in the supplied ink is provided through an adhesion portion g. In a similar way to the other adhesion portions, the adhesion portion g is also one formed by the curing of the adhesive agent composition according to the present invention.

In the inkjet head 1a of this embodiment, the adhesion portion a, the adhesion portion b, and the adhesion portions e to h are regions brought into direct contact with the ink.

Next, a description will be made of the ink for use in this embodiment.

When the ink for use in the inkjet head of the present invention contains a solvent in which a solubility parameter (SP) value ((cal/cm)$^{1/2}$) is 9.5 to 15.0 and a dipole moment is 2.0 to 4.5 by 3% or more with respect to the entire solvents, the ink has a particularly significant effect of the present invention. As specific examples of such a solvent, there are mentioned N,N-dimethylformamide (SP=12.1, dipole moment=3.86), N-methyl-2-pyrrolidinone (SP=11.3, dipole moment=4.09), ethyl lactate (SP=10.0, dipole moment=2.14), cyclohexanone (SP=9.9, dipole moment=3.01), 2-pyrrolidinone (SP=14.7, dipole moment=3.83), and the like. The SP values are ones obtained by calculating by means of the Bicerano method (refer to Jozef Bicerano, "Prediction of Polymer Properties (Plastics Engineering, 65)). The dipole moments are ones obtained by calculation based on AM1 of MOPAC.

Here, the SP value means a value of a solubility parameter for use in determining solubility of a resin member to an organic solvent. SP of the solvent refers to a square root of a cohesion energy density of the solvent concerned. SP of resin refers to SP of a solvent which dissolves the resin concerned best. SP is a concept proposed for a substance which does not have polarity. Accordingly, substances which do not have polarities will be dissolved into each other if SPs thereof coincide with each other or if a difference therebetween is 1.35 or less. However, if the substances have polarities, the above-described difference is increased, and a variety of resins are dissolved in a variety of solvents. Since many materials for use in the inkjet head and the ink have polarities, it is preferable to consider the SPs and the dipole moments representing the polarities of the solvents simultaneously in order to determine the solubilities of the materials.

Since SP of N-methylpyrrolidone to be used as a solvent for vinyl chloride is equal to 11.3, the N-methylpyrrolidone dissolves resin with SP equal to approximately 10 to 13 well. Moreover, since the polarity of N-methylpyrrolidone is high because the dipole moment thereof is 4.09, N-methylpyrrolidone even dissolves resin of which SP value is out of the above-described range if the resin has polarity. As described above, dissolving power of N-methylpyrrolidone is extremely strong, and swells and dissolves most of resins excluding fluororesin and thermosetting resin cured completely.

SP of the organic resins for use in the inkjet head, which include epoxy resin, is approximately 9 to 11, and almost all thereof are dissolved into N-methylpyrrolidone. N-methylpyrrolidone is an extremely strong solvent, and dissolves many resins. A coating apparatus of a liquid crystal orientation film is made of stainless steel, and the ink in which polyimide is dissolved in N-methylpyrrolidone is used while being reserved in a stainless steel container. If the inkjet head is made of stainless steel, and stainless steel members are joined together by an eutectic alloy, then solvent resistance of the joined members becomes perfect. However, it is difficult to manufacture the inkjet head with a micro structure by stainless steel poor in processability. Moreover, even if it is possible to manufacture the inkjet head, a price of the manufactured inkjet head becomes high. In order to manufacture a high-performance inkjet head with a micro structure at a low price, it is preferable to manufacture the inkjet head by adhering the piezoelectric element and the resin member together. The resin member can be formed by injection molding, and accordingly, a manifold with a complicated structure can be manufactured easily. However, there has not been a good adhesive agent with solvent resistance, it has been impossible to manufacture such a high-performance inkjet head. Alternatively, though it is possible to manufacture a small inkjet head, a lifetime thereof has been short, and reliability thereof has not been sufficient.

Here, in the inkjet head 1a of FIG. 1, it is necessary that the adhesion portion a and the adhesion portion b be as thin as possible and not run over to portions which do not require the adhesion. The adhesion portion a and the adhesion portion b are portions for which adhesion precision is required most. For the adhesion portion c, it is preferable to use an adhesive agent of which thermal contraction in the case of the curing is small. Since the adhesion portion d is located on the periphery of a contact with the drive IC, it is preferable to use, for the adhesion portion d, a strong adhesive agent for a stress. For the adhesion portion g, it is preferable to set the amount of adhesive agent at a small amount for the purpose of preventing clogging of the filter.

Moreover, for the adhesion portions a to h in FIG. 1 and the adhesion portion 80 in FIG. 3, it is preferable that an adhesion step be performed under conditions of a low temperature of 100° C. or less and a short time, under which piezoelectric property of the piezoelectric ceramic base 11 is not lost, and that the adhesive agent not run over to the portions other than the adhered portions in a process of the curing.

In this embodiment, the adhesive agent composition according to the present invention is used for the adhesion portions a to h and the adhesion portion 80, and the problems as described above are thus solved. Moreover, it is possible to adhere together such members of which linear thermal expansion coefficients have the difference exceeding 12 ppm/K. Furthermore, the solvent ink can be used, and one containing, as the solvent, a solvent in which the SP value is 9.5 to 15.0 and the dipole moment is 2.0 to 4 by 3% or more with respect to the entire solvents can be used.

Next, a description will be made of a manufacturing method of the inkjet head 1a using the adhesive agent composition according to the present invention.

First, a description will be made of a manufacturing method of the ink chamber 3. The ink chamber 3 of this embodiment is formed in such a manner that the piezoelectric ceramic base 11 and the cap member 2 are adhered to each other, the adhered member is then cut in the fore and aft direction of the ink chamber 3, and two ink chambers 3 are formed.

First, the piezoelectric element 11B is adhered to the front surface of the piezoelectric element 11A by using the adhesive agent composition according to the present invention, and the piezoelectric ceramic base 11 is thus formed. In this case, the piezoelectric element 11A and the piezoelectric element 11B are adhered to each other so that the polarization directions thereof can be reverse to each other, and between both of them, the adhesion portion 80 made of the adhesive agent composition according to the present invention is formed.

Subsequently, the ink passages 5 are formed by dicing on the front surface of the piezoelectric ceramic base 11. In this case, as shown in FIG. 4A, a shape of each ink passage 5 when viewed from the side is formed so that both ends thereof can form circular arc shapes, and that a center thereof can be substantially parallel to the front surface of the piezoelectric ceramic base 11.

Then, the electrode layer 3a is formed on the inside of each ink passage 5 in FIG. 3 by a film forming method such as an evaporation method. Thereafter, in a similar way, the protection layer 4 is formed on the inside of the electrode layer 3a. The FPC 40 is electrically connected to the upper end of the electrode layer 3a, and the adhesion portion c is formed therebetween by using the adhesive agent composition according to the present invention. The FPC 40 is adhered to the piezoelectric ceramic base 11 in a reinforced manner, and the adhesion portion i made of the adhesive agent composition according to the present invention is formed.

Subsequently, in FIG. 2, the cap member 2 is adhered to the front surface of the piezoelectric ceramic base 11 by using the adhesive agent composition according to the present invention, and the adhesion portion a is formed. The cap member 2 is formed so that the length dimension thereof in the vertical direction can be shorter than the length dimension of the ink passage 5. Accordingly, as shown in FIG. 4A, a part of the front surface of the ink passage 5 is left opened. The cap member 2 is formed so that the length dimension thereof in the vertical direction can be substantially equivalent to the length dimension of the ink chamber 3. Accordingly, as shown in FIG. 4A, a lower portion of the front surface of the ink passage 5 is entirely coated. The cap member 2 is adhered to the piezoelectric ceramic base 11 in such a way, and the inside of the protection layer 4 of the piezoelectric ceramic base 11 thus becomes the ink passage 5. Here, FIG. 4B is a cross-sectional view along a line II-II in FIG. 4A. Note that, for the purpose of simplifying the illustrations, the electrode layer 3a and the protection layer 4 are omitted in FIGS. 4A and 4B.

Figure 5:
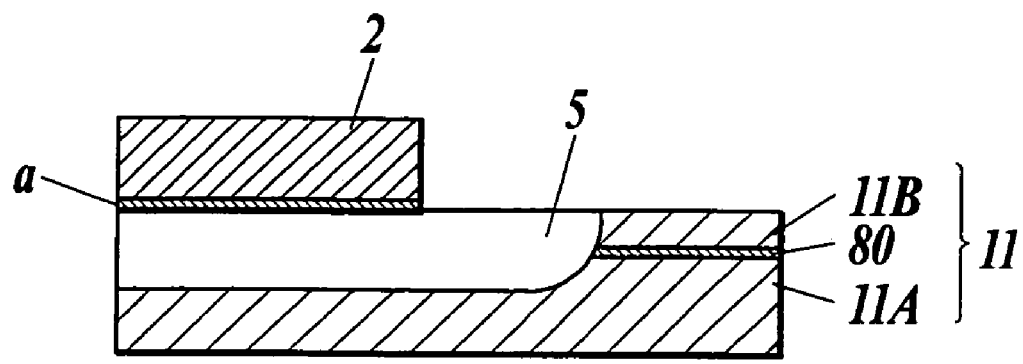
FIG. 5 is an explanatory view of the manufacturing method of an inkjet head.

Then, in such a state where the piezoelectric ceramic base 11 and the cap member 2 are adhered to each other, the adhered member is cut into two so that cut pieces can be symmetrical along the right and left direction of the ink chamber 3. FIG. 5 shows a state of one of the cut pieces.

Figure 6:
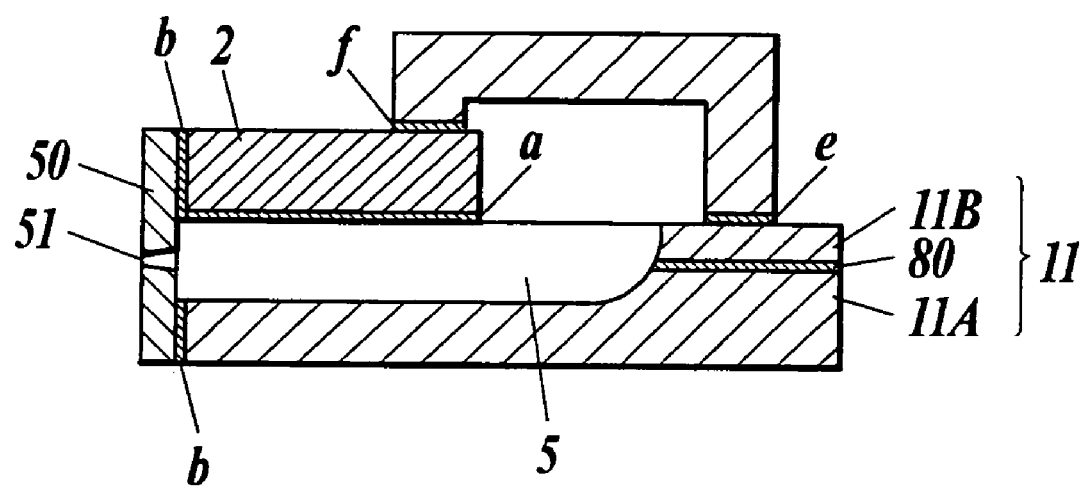
FIG. 6 is an explanatory view of the manufacturing method of an inkjet head.

After the cutting, as shown in FIG. 6, the manifold 20 is adhered to the cut piece so as to cover the opening of the front surface of the ink passage 5. In this case, one end of the manifold 20 is adhered to the front surface of the piezoelectric ceramic base 11, and the adhesion portion e is formed. The other end of the manifold 20 is adhered to the front surface of the cap member 2, and the adhesion portion f is formed. Since the manifold 20 is coupled to the ink reservoir portion through the ink tube 30, the ink from the manifold 20 flows into the ink chamber 3 through the opening of the ink passage 5.

The nozzle plate 50 is adhered to the lower surface of the cut ink chamber 3 by using the adhesive agent composition according to the present invention. In this case, the nozzle plate 50 is adhered to the lower surface concerned so that the nozzle holes 51 can be opposite to positions opposite to the ink passages 5, and the adhesion portion b is formed.

The ink chamber 3 manufactured as described above is attached to the cover 10, and the inkjet head 1a is thus formed.

Next, a description will be made of a function of the inkjet head 1a by using FIG. 7 and FIG. 8. Note that the respective adhesion portions and the protection layer 4 are omitted in FIG. 7 and FIG. 8.

Figure 7A:
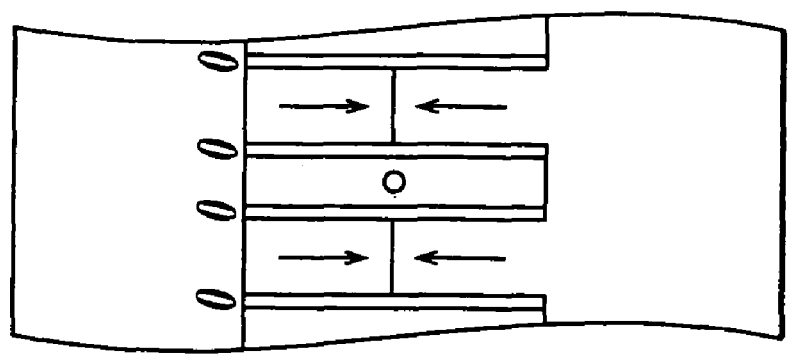
FIGS. 7A to 7C are explanatory views of deformation of ink passages.
Figure 7B:
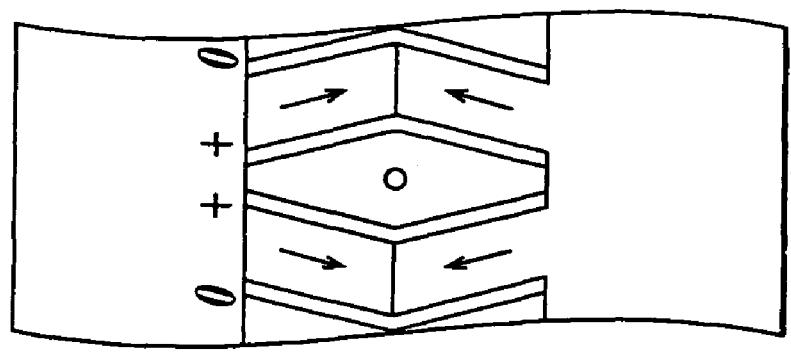
Figure 7C:
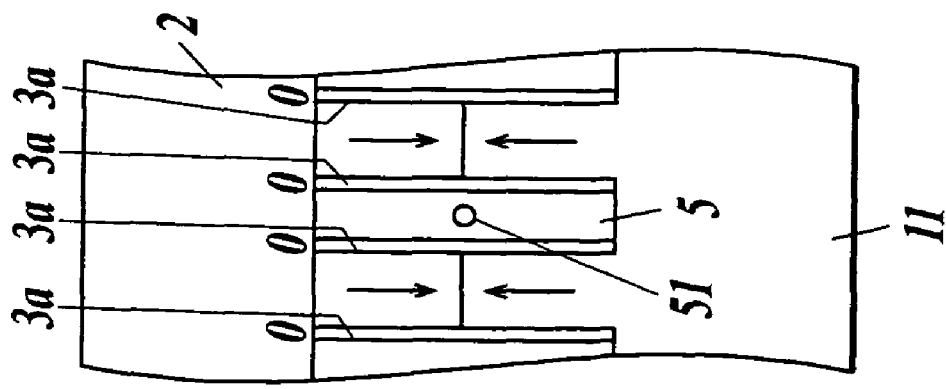

FIGS. 7A to 7c are an example of the deformation of the ink chamber 3. In this embodiment, the ink chamber 3 fluctuates in the right and left direction in FIGS. 7A to 7C based on an image signal inputted to the inkjet head 1a, thereby varying the inner capacity of each ink passage 5, and jetting the ink droplet D.

First, when the image signal is inputted to the inkjet head 1a, the image signal concerned is transmitted to the FPC 40. Since the drive IC 45 is adhered to the FPC 40, the drive IC 45 generates a voltage of a predetermined value based on the image signal transmitted thereto. The generated voltage is applied to the electrode layer 3a of the ink chamber 3 through the adhesion portion i.

The electrode layer 3a is pasted to the piezoelectric ceramic base 11. Accordingly, when the voltage is applied to the electrode layer 3a, the voltage is also applied to the piezoelectric ceramic base 11. Here, the piezoelectric ceramic base 11 is composed of the piezoelectric element 11A and the piezoelectric element 11A which are polarized in the directions reverse to each other. Accordingly, the polarized regions of the piezoelectric ceramic base 11 undergo the shear deformation so as to be bent as shown in FIGS. 7A to 7C when the voltage is applied thereto.

In this embodiment, two wall surfaces of each ink passage 5, which are opposite to side surfaces of each ink passage 5, fluctuate. As shown in FIGS. 7A to 7C, the polarized regions adjacent to each other are deformed so as to be bent to the reverse sides in the right and left direction, and the inner capacity of the ink passage 5 is varied. When the inner capacity of the ink passage 5 is varied, the ink droplet D is jetted from the ink passage 5 in which the inner capacity is reduced following the variation.

As described above, by using the adhesive agent composition according to the present invention, the members of which linear thermal expansion coefficients have the difference exceeding 12 ppm/K can be adhered to each other under a temperature condition of 60° C. or less. Accordingly, the inkjet head 1a can be manufactured easily without depolarizing the piezoelectric element, and the inkjet head 1a of which solvent resistance is high is manufactured. Moreover, by using the adhesive agent composition according to the present invention, stresses are absorbed, which are applied among the adhesion portions a to h and 80, and the piezoelectric ceramic base 11 as a channel substrate, the adhered members (the cap member 2, the nozzle plate 50, the manifold 20, and the like) to be adhered to the piezoelectric ceramic base 11, or the second adhered members (the manifold 20, the ink tube 30, the filter 35, and the like) to be adhered to the adhered members concerned.

In particular, when the manifold 20 is molded of thermoplastic resin, though it is easy to mold the manifold 20, the manifold 20 has a large linear thermal expansion coefficient, and a difference thereof in linear thermal expansion coefficient from the piezoelectric ceramic base 11 and the cap member 2 is prone to exceed 12 ppm/K. Moreover, since a cross-sectional area of the manifold 20 is large, stresses applied thereto from the piezoelectric ceramic base 11 and the cap member 2 are large (meanwhile, stresses applied from the manifold 20 to the piezoelectric ceramic base 11 and the cap member 2 are also large). Therefore, in this case, in the piezoelectric ceramic base 11, the cover plate 2, and the manifold 20, a crack, deflection, exfoliation, and the like are prone to occur. However, since these members are adhered together by the above-described adhesive agent in this embodiment, the crack, deflection, exfoliation, and the like of the members concerned can be prevented effectively.

For example, when the piezoelectric ceramic base 11 and the manifold 20, which are adhered to each other through the adhesion portion e, are taken as an example, a difference therebetween in linear thermal expansion coefficient exceeds 12 ppm/K.

Moreover, in the case of using the nozzle plate 50 made of polyimide, a difference in linear thermal expansion coefficient between the nozzle plate 50 and the piezoelectric ceramic base 11 also exceeds 12 ppm/K. Heretofore, when the nozzle plate as described above and the channel substrate (the piezoelectric ceramic base in this embodiment) are adhered to each other, there has been problems that the adhesion is performed in a state where the position of the nozzle plate is misaligned, and that the jetting performance is decreased because the adhesive agent composition flows into the nozzle holes. However, the above-described problems can be solved by adhering these members to each other by using the adhesive agent composition according to the present invention.

Specifically, when the nozzle plate of which difference in linear thermal expansion coefficient from the ink chamber 3 exceeds 12 ppm/K is adhered to an end surface of the ink chamber 3, microparticles with a mean particle diameter of 0.1 μm or less are added by 0.2 to 10% to the adhesive agent composition according to the present invention, and the viscosity of the adhesive agent composition is thus increased, followed by the adhesion. In such a way, the adhesive agent composition can be prevented from flowing to the spots other than the adhered portions when the adhesive agent composition is cured.

Figure 8C:
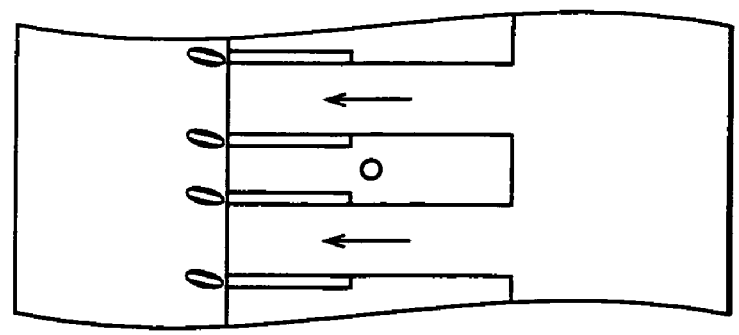
FIGS. 8A to 8C are explanatory views of deformation of ink passages.
Figure 8B:
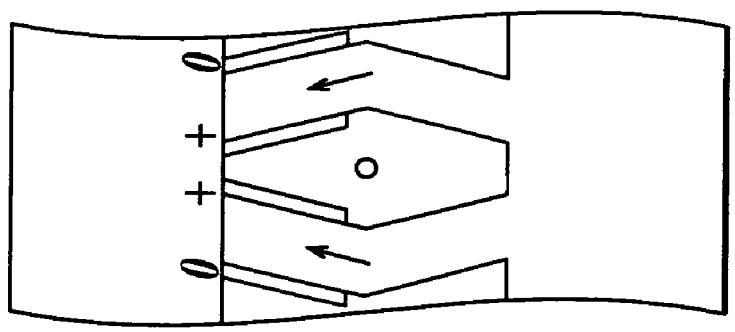
Figure 8A:
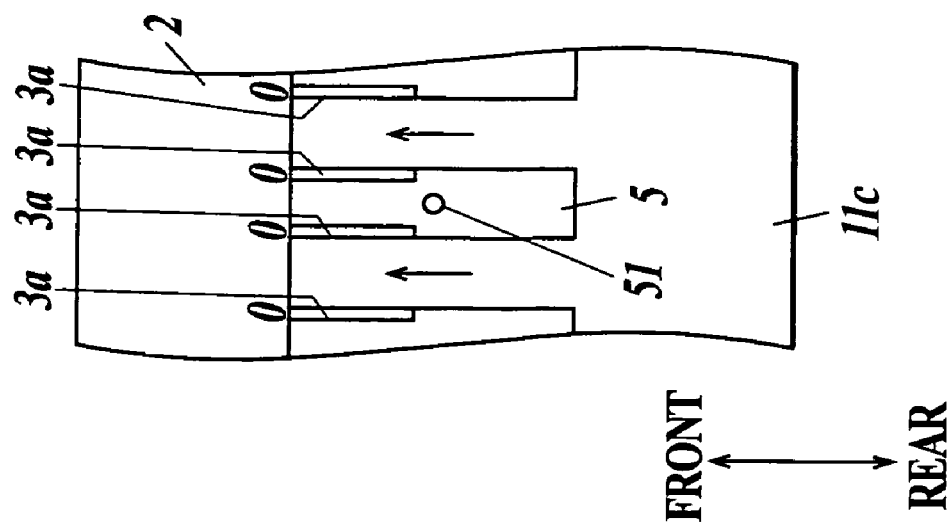

Note that, in this embodiment, the piezoelectric ceramic base 11 includes the piezoelectric element 11A and the piezoelectric element 11B. As shown in FIGS. 8A to 8C, the piezoelectric ceramic base 11 may be formed of one piezoelectric element 11C. In this case, though a deformation amount of the piezoelectric element 11c is limited, the deformation of the ink passages 5 when the voltage is applied to the electrode layers 3a is increased if the electrode layers 3a are provided on frontal halves of the ink passages 5 of the piezoelectric ceramic base 11 as shown in FIGS. 8A to 8C. Such a configuration is also preferable.

Though the ink is supplied to all the ink passages 5 of the piezoelectric ceramic base 11 of this embodiment, the ink passages 5 to which the ink is supplied and the ink passages 5 to which the ink is not supplied may be provided alternately in the ink passages 5. In this case, as compared with the case of jetting the ink by using all the ink passages 5, the influence from the deformations of the piezoelectric element 11A and the piezoelectric elements 11B can be absorbed by the ink passages 5 to which the ink is not supplied, the ink passages 5 are being adjacent to the piezoelectric elements 11A and 11B. Accordingly, the inner capacity of each ink passage 5 can be varied accurately.

Second Embodiment

Figure 9:
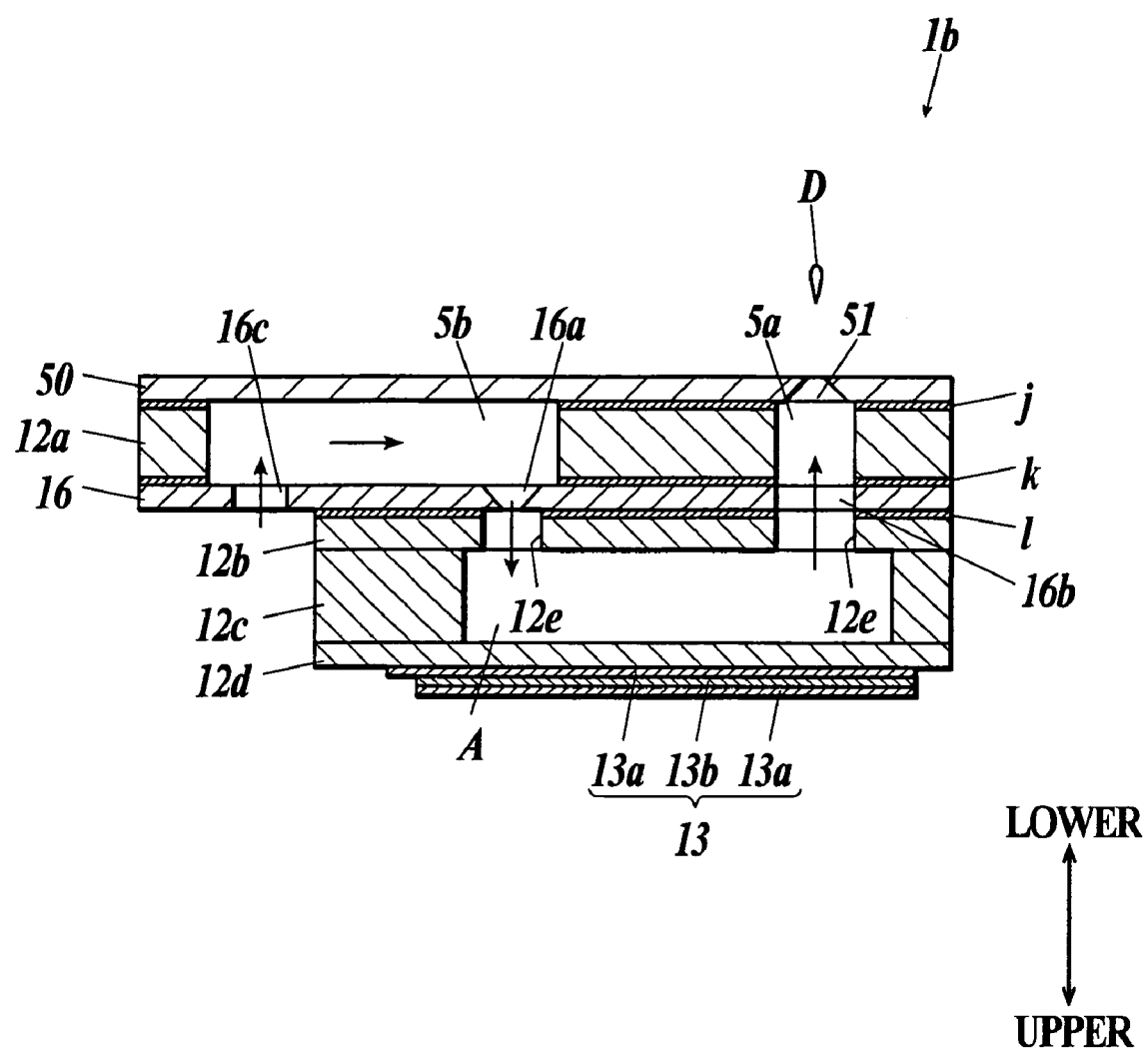
FIG. 9 is a longitudinal cross-sectional view of an inkjet head according to a second embodiment.

FIG. 9 is a longitudinal cross-sectional view of an inkjet head 1b of a type in which the inner capacity of each ink passage is varied by extension/contraction deformation of the piezoelectric element provided on the outer surface of the ink passage.

In the inkjet head 1b of FIG. 9, the nozzle plate 50 in which the nozzle holes 51 are formed is provided so as to be opposite to a recording medium. Onto the upper surface of the nozzle plate 50, a passage plate 12a is adhered through an adhesion portion j. In the passage plate 12a, a first ink passage 5a extended in the vertical direction and formed to have an inner diameter larger than that of each nozzle hole 51 by a predetermined dimension is formed so as to be opposite to the nozzle hole 51. At a position of the passage plate 12a, which is not opposite to the nozzle hole 51, a second ink passage 5b extended in the vertical direction is formed.

Onto the upper surface of the passage plate 12a, a supply plate 16 is adhered through an adhesion portion k. In the supply port 16, a first hole portion 16b substantially similar in cross-sectional shape to the first ink passage 5a is formed so as to be opposite to the first ink passage 5a. At a position of the supply plate 16, which is opposite to the second ink passage 5b, an ink introduction port 16a having a tapered shape in cross section is formed so as to be opposite to a pressurization chamber A to be described later. As a position of the supply plate 16, which is not opposite to a connection plate 12b to be described later, a second hole portion 16c is formed. The ink reservoir (not shown) is coupled to the second hole portion 16c. The ink is supplied to the second ink passage 5b through the second hole portion 16c.

Onto the upper surface of the supply plate 16, the connection plate 12b formed so that a length dimension thereof in the width direction can be shorter than that of the supply plate 16 is adhered. The connection plate 12b and the supply plate are adhered to each other through an adhesion portion l. Here, the adhesion portions j to l are ones formed by the curing of the adhesive agent composition according to the present invention.

At positions of the connection plate, which are opposite to the first hole portion 16b and the ink introduction port 16a, hole portions 12e and 12e are formed, respectively.

Onto the upper surface of the connection plate 12b, a spacer plate 12c including an inner space which covers the hole portions 12e is adhered. Moreover, onto the upper surface of the spacer plate 12c, a flat closing plate 12d is adhered. Here, the vertically upper and lower portions of the inner space of the spacer plate 12c are surrounded by the closing plate 12d and the connection plate 12b, and the pressurization chamber A is thus formed. The closing plate 12d is formed of a material freely deformable in the vertical direction, thereby varying the inner capacity of the pressurization chamber A in response to the deformation of the closing plate 12d.

As described above, the respective plates are stacked on one another, and the ink reservoir portion, the second ink passage 5b, the pressurization chamber A, the first ink passage 5a, and the nozzle hole 51 are thus connected to one another in this order. Thus, the ink flows in a direction of arrows described in FIG. 9, and the ink droplets D are jetted.

On the upper surface of the closing plate 12d, an piezoelectric element 13 is provided which deforms based on an image signal. For the piezoelectric element 13, a publicly known one is used, which includes an electrode 13a, a piezoelectric element layer 13b, and an electrode 13a in this order.

Note that, for the respective plates 50, 16 and 12a, in general, it is preferable to use plastics and ceramics of metal and silicon such as nickel and stainless steel for the purpose of forming the nozzle hole 51 and the ink introduction port 16a with high dimensional precision. Moreover, as shown in FIG. 9, it is desirable that the ink introduction port 16a be formed into a tapered shape reduced in diameter toward the ink flowing direction.

It is preferable that the closing plate 12d, the spacer place 12c, and the connection plate 12b be made of ceramics. For a material of the ceramics, it is preferable to use alumina, zirconia, and the like in terms of processability. A plate thickness of the closing plate 12d is preferably 50 μm or less, more preferably, approximately 3 to 12 μm. A plate thickness of the connection plate 12b is preferably 10 μm or more, more preferably, 50 μm or more. A plate thickness of the spacer plate 12c is preferably 50 μm or more, more preferably, 100 μm or more.

Although the pressurization chamber A can be formed as an integrally fired body, it is preferable to adhere the respective plates together by the adhesive agent in terms of processing precision.

The piezoelectric element 11B is one formed by forming the respective constituents by means of a film forming method. In this case, it is preferable to use, as the closing plate 12d, a ceramic substrate containing zirconium oxide as a main component. Preferably, PZT is used as a material of the piezoelectric layer 13b constituting a piezoelectric operation portion.

Third Embodiment

Figure 10:
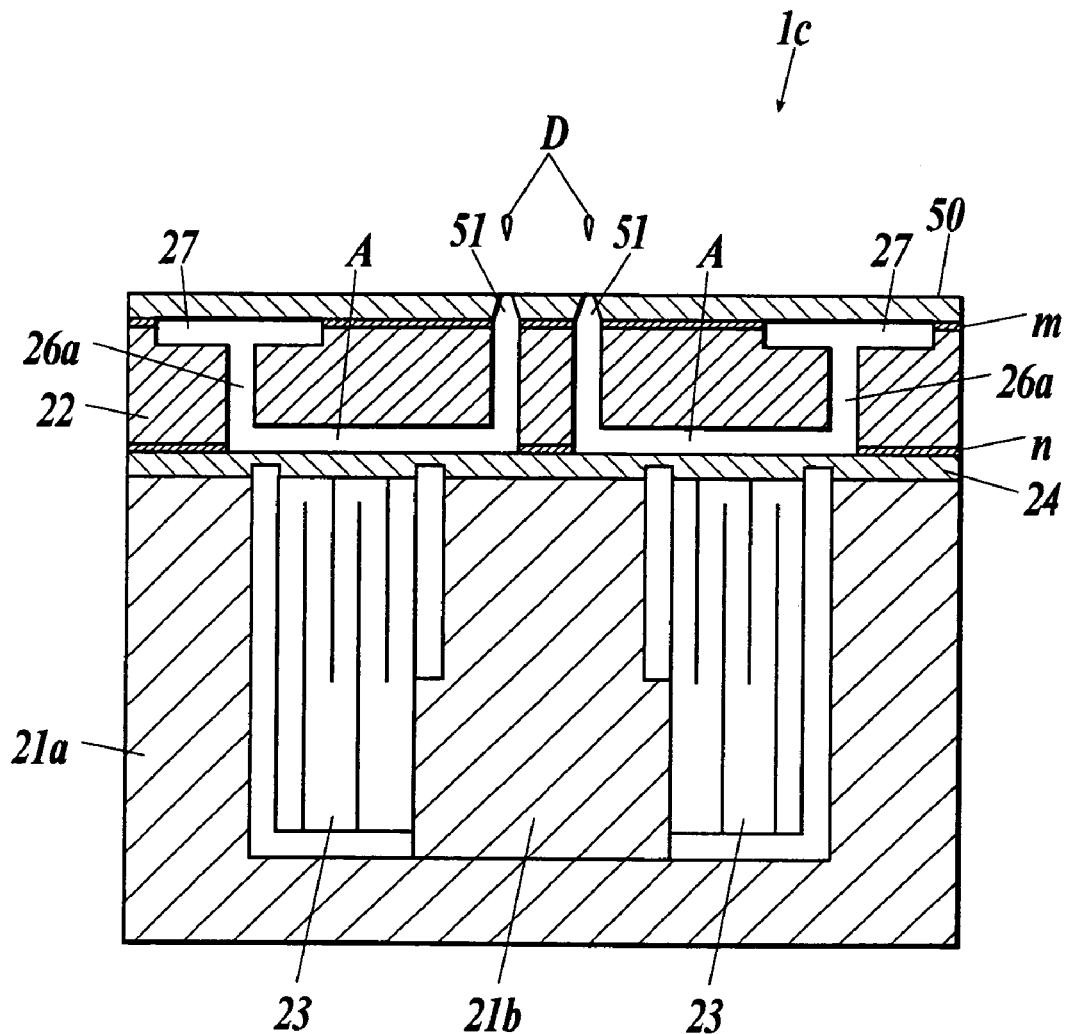
FIG. 10 is a longitudinal cross-sectional view of an inkjet head according to a third embodiment.

FIG. 10 is a cross-sectional view of an inkjet head of the same type as but different in structure from that of the second embodiment in which the inner capacity of the pressurization chamber A is varied by the extension/contraction deformation of the piezoelectric element provided outside of the pressurization chamber A.

In an inkjet head 1c, the nozzle plate 50 in which the nozzle holes 51 are formed is provided so as to be opposite to a recording medium. Onto the upper surface of the nozzle plate 50, a spacer member 22 is adhered through an adhesion portion m. In the spacer member 22, the ink passage 5 made of an elastic material is provided so that one end thereof can be connected to the nozzle holes 51. In the other end of the ink passage, an ink supply portion 27 coupled to the ink reservoir portion (not shown) is provided.

Onto the upper surface of the spacer member 22, a vibration plate 24 made of an elastic material is adhered, and an adhesion portion n is formed therebetween. Here, the adhesion portions m and n are ones formed of the adhesive agent composition according to the present invention.

On the upper surface of the vibration plate 24, a base 21b including convex portions extended in the right and left direction on both side surfaces is provided. On both of the side surfaces of the base 21b and on the upper surface of the vibration plate 24, piezoelectric elements 23 are provided so as to extend and contract in the vertical direction when a voltage is applied to electrode portions thereof. Each piezoelectric electric element 23 deforms the ink passage 5 through the vibration plate 24. When the piezoelectric element 23 extends downward of the inkjet head 1c, the piezoelectric element 23 applies a pressure to the ink passage 5 so as to reduce the inner capacity thereof.

On the upper end surface of the vibration plate 23, a fixing member 21a which covers and fixes the upper surfaces of the piezoelectric elements 23 and the base 21b is provided.

By forming the inkjet head 1c as described above, the voltage is applied to the piezoelectric elements 23 based on image information, the ink passages 5 are deformed, and the ink droplets D are jetted from the nozzle holes 51.

Note that, though inner diameters of the ink passages 5 are made uniform in FIG. 10, the inner diameters of the ink passages 5 may be made smaller as approaching the nozzle holes 51 in order to transmit the pressure from the piezoelectric elements 23 to the ink efficiently and then to jet the ink droplets D.

Examples

A description will be made below more in detail of the present invention by using examples; however, the present invention is not limited to these at all.

Example 1

In Example 1, adhesive agent compositions (hereinafter, "adhesive agents") made of various components were prepared, and solvent resistances thereof were investigated.

After bases and activators, which are described in Table 1, were mixed together, the obtained mixtures were dropped on a Teflon (registered trademark) sheet so that one droplet thereof could be 0.1 to 0.2 g, and were cured at 60° C. for 3 hours. In such a way, pellets of the adhesive agents were prepared.

TABLE 1

| | BASE | | | | ACTIVATOR | | MASS INCREASING RATIO | |
|---|---|---|---|---|---|---|---|---|
| | 1 | 2 | 3 | 1:2:3 (MASS) | ACTIVATOR | phr | N-METHYL PILORIDONE | DIMETHYL FORMAMIDE |
| COMPARATIVE 1 | E1 | — | — | 100:0:0 | H1 | 8 | NOT HARDENED | NOT HARDENED |
| COMPARATIVE 2 | E1 | E3 | — | 60:40:0 | H4 | 100 | CRACKED | 22.3 |
| COMPARATIVE 3 | E2 | E3 | — | 70:30:0 | H2 | 8 | 15.4 | 12.6 |
| COMPARATIVE 4 | E1 | E4 | — | 80:20:0 | H3 | 10 | 17.6 | 13.1 |
| COMPARATIVE 5 | E2 | E4 | | 70:30:0 | Z4 | 10 | 14.5 | 16.0 |
| INVENTIVE 1 | E2 | E4 | — | 60:40:0 | Z1 | 10 | 7.5 | 4.6 |
| INVENTIVE 2 | E2 | E4 | — | 70:30:0 | Z1 | 10 | 3.2 | 2.5 |
| INVENTIVE 3 | E2 | E4 | — | 70:30:0 | Z2 | 10 | 3.9 | 3.5 |
| INVENTIVE 4 | E2 | E4 | — | 70:30:0 | Z3 | 10 | 4.8 | 4.1 |
| INVENTIVE 5 | E2 | E3 | — | 70:30:0 | Z1 | 10 | 10.7 | 9.6 |
| INVENTIVE 6 | E2 | E5 | — | 80:20:0 | Z1 | 10 | 5.4 | 7.7 |
| INVENTIVE 7 | E1 | E6 | — | 80:20:0 | Z2 | 10 | 6.5 | 6.8 |
| INVENTIVE 8 | E1 | E4 | — | 80:20:0 | Z3 | 10 | 8.6 | 7.2 |
| INVENTIVE 9 | E2 | E4 | E3 | 40:30:30 | Z1 | 10 | 3.1 | 2.3 |
| INVENTIVE 10 | E4 | — | — | 100:0:0 | Z1 | 10 | 1.2 | 1.8 |

Note:
"CRACKED" represents that it was impossible to measure because the adhesive agent was broken when immersed.

Here, compounds in Table 1 are as follows.

(Base)

E1: bisphenol A type epoxy resin (epoxy equivalent: 184 to 194) (EPIKOTE 828: prepared by Japan Epoxy Resins Co., Ltd., which is a compound having two epoxy groups)

E2: bisphenol F type epoxy resin (epoxy equivalent: 160 to 170) (EPIKOTE 806: prepared by Japan Epoxy Resins Co., Ltd., which is a compound having two epoxy groups)

E3: phenol novolac type epoxy resin (epoxy equivalent: 172 to 178) (EPIKOTE 152: prepared by Japan Epoxy Resins Co., Ltd., which is a compound having three epoxy groups)

E4: triglycidyl-p-aminophenol (a compound having three epoxy groups)

E5: tetraglycidyl diaminodiphenyl methane (a compound having four epoxy groups)

E6: tetraglycidyl-1,3-diaminomethylcyclohexane (a compound having four epoxy groups)

(Imidazole-series activator according to the present invention)

Z1: 1-benzyl-2-methylimidazole

Z2: 1-methylimidazole

Z3: 1-benzyl-2-phenylimidazole (Imidazole-series activator out of the present invention)

Z4: 2-phenylimidazole (Activator other than imidazole-series activator)

H1: hexahydro phthalic anhydride

H2: diethylene triamine

H3: triethylene tetramine

H4: polyamide

Moreover, phr in Table 1 is values obtained by the following expression: activator mass/base mass × 100.

After measuring mass of the prepared pellet of the mass, the pellet was immersed in the solvent (N-methylpyrrolidone or dimethylformamide) described in Table 1, and was left at 60° C. for seven days. Then, the pellet was taken out of the solvent, and was washed by isopropyl alcohol in a wash bottle. Thereafter, the isopropyl alcohol on the surface of the pellet was removed, and the mass of the pellet was measured. Note that a mass increase rate of the pellet was obtained by the following expression.

mass increase rate=100×(mass after immersion−mass before immersion)/mass before immersion From Table 1, it is understood that, in the adhesive agents (of the present invention 1 to 10) obtained by combining the bases and the activators according to the present invention, the mass increase rates are smaller than those of Comparative examples 1 to 5, and that the adhesive agents according to the present invention are excellent in solvent resistance.

Example 2

PZT (thickness: 700 μm; Curie temperature: 210° C.; linear thermal expansion coefficient: 4 ppm/K) and PZT (thickness: 150 μm; Curie temperature: 210° C.; linear thermal expansion coefficient: 4 ppm/K) were adhered to each other so that the polarization directions thereof could be reverse to each other by using an adhesive agent A according to the present invention, which will be described as below. In such a way, a piezoelectric ceramic base was formed. Subsequently, concave portions with a depth of 300 μm and a width of 70 μm were formed from the thinner PZT side as shown in FIGS. 4A and 4B. Then, aluminum was deposited on side surfaces of the concave portions, and electrode layers were formed. As shown in FIG. 4A, a cap member (AlN with a thickness of 700 μm, linear thermal expansion coefficient: 4 ppm/K) was joined to a joined member of the PZTs of the piezoelectric ceramic base by using the adhesive agent A, and by a CVD method, poly-p-xylylene was coated thereon as an insulating layer. Thereafter, a body thus obtained was cut along the direction perpendicular to the length direction of the concave portions, and a head chamber was thus formed (refer to FIG. 5). Onto the head chamber, a nozzle plate (one in which nozzle holes with a diameter of 30 μm are formed in polyimide with a thickness of 100 μm) was joined by using the adhesive agent A (refer to FIG. 6). Thereafter, as shown in FIG. 6, an electrode was drawn out, and the manifold (made of PBT, linear thermal expansion coefficient: 100 ppm/K) was adhered by using the adhesive agent A, followed by curing, and an inkjet head was constituted.

<Composition of Adhesive Agent A>

| | |
|---|---|
| EPIKOTE 807 (bisphenol F; epoxy equivalent: 165; prepared by Japan Epoxy Resins Co., Ltd.) | 70 parts by mass |
| triglycidyl-p-aminophenol (epoxy equivalent: 95) | 30 parts by mass |
| 1-benzyl-2-methylimidazole | 10 parts by mass |
| vapor spherical silica (mean particle diameter: 15 nm) | 3 parts by mass |

<Heating Conditions for Adhesive Agent A at Joining>
Heating temperature: 45° C.
Heating time: 13 hours <Jetting Test>

A jetting test was performed for the constituted inkjet head by using dummy ink for jetting evaluation, which does not contain colorant. Composition of the dummy ink is as follows.

| | |
|---|---|
| butoxyethyl acetate | 50 parts by mass |
| dimethylformamide (SP = 12.1, dipole moment = 3.86) | 50 parts by mass |

A difference between the maximum jetting speed and the minimum jetting speed in the nozzles was 7%, and uniformity of the jetting speed was satisfactory. Moreover, after the ink was filled in the inkjet head and was left for 4 weeks at 60° C., there was no ink leakage.

Next, as a comparative example, the adhesive agent A was replaced by the following adhesive agent B, and the adhesive agent B was cured under heating conditions similar to the above. Then, ink leakage occurred. Then, the curing was performed while changing the temperature to 70° C., and as a result, a difference between the maximum jetting speed and the minimum jetting speed in the jetting test was 18%, which was problematic in uniformity.

<Composition of Adhesive Agent B>

In place of 1-benzyl-2-methylimidazole, 2-ethyl-4-methylimidazole (Z5) was used. Other than the above, the adhesive agent B was prepared similarly to the adhesive agent A.

Results of Example 2 are shown in Table 2.

TABLE 2

| | ADHESIVE AGENT | | | | EVALUATION | |
|---|---|---|---|---|---|---|
| | | COMPOSITION (PARTS BY MASS) | | | | JETTING |
| | ADHESIVE AGENT | BASE | | ACTIVATOR | CURING CONDITION | INK LEAKAGEAGE TEST | SPEED DISTRIBUTION |
| INVENTIVE | A | E7 (70) | E4 (30) | Z1 (10) | 45° C. 13 H | NO INK LEAKAGEAGE AFTER 4 WEEKS | UNIFORM |
| COMPARATIVE | B | E7 (70) | E4 (30) | Z5 (10) | 45° C. 13 H | INK LEAKAGEAGE OCCURRED | — |
| COMPARATIVE | | | | | 70° C. 13 H | — | NONUNIFORM |

Here, compounds in Table 2 are as follows.
E4: triglycidyl-p-aminophenol (a compound having three or more epoxy groups)
E7: EPIKOTE 807 (bisphenol F type epoxy resin (a compound having two epoxy groups)
Z1: 1-benzyl-2-methylimidazole (imidazole-series activator according to the present invention)
Z5: 1-benzyl-2-methylimidazole (imidazole-series activator out of the present invention)

From Table 2, it is understood that, when the imidazole-series activator according to the present invention is used, the ink leakage is less prone to occur, and excellent solvent resistance is brought. Moreover, it is understood that, when the imidazole-series activator according to the present invention is used, the jetting speed is uniform, and excellent jetting performance is brought. Moreover, members of which linear thermal expansion coefficients have the difference exceeding 12 ppm/K can be adhered together, and the inkjet head can be manufactured by using a manifold with a linear thermal expansion coefficient of 100 ppm/K.

Example 3

PZT (thickness: 700 μm; Curie temperature: 210° C.; linear thermal expansion coefficient: 4 ppm/K) and PZT (thickness: 150 μm; Curie temperature: 210° C.; linear thermal expansion coefficient: 4 ppm/K) were adhered to each other so that the polarization directions thereof could be reverse to each other by using an adhesive agent C according to the present invention, which will be described as below. In such a way, a piezoelectric ceramic base was formed. Subsequently, concave portions with a depth of 300 μm and a width of 70 μm were formed from the side of the PZT with a thickness of 150 μm as shown in FIG. 3, and electrode layers were formed. To a joined member of the PZTs of the piezoelectric ceramic base, as shown in FIG. 4A, a cap member (AlN with a thickness of 700 μm, linear thermal expansion coefficient: 4 ppm/K) was joined by using the adhesive agent C, and an obtained joined body was subjected to parylene treatment. Thereafter, the body was cut along the direction perpendicular to the length direction of the concave portions, and a head chamber was thus formed (refer to FIG. 5). Onto the head chamber, a nozzle plate (one in which nozzle holes with a diameter of 30 μm are formed in polyimide with a thickness of 100 μm) was joined by using the adhesive agent C (refer to FIG. 6). Thereafter, as shown in FIG. 6, an electrode was drawn out, and the manifold (made of polyamide, linear thermal expansion coefficient: 500 ppm/K) was adhered by using the adhesive agent C, followed by curing, and an inkjet head was constituted.
<Composition of Adhesive Agent C (Present Invention)>

| | |
|---|---|
| EPIKOTE 807 (bisphenol F; epoxy equivalent: 165; prepared by Japan Epoxy Resins Co., Ltd.) | 40 parts by mass |
| triglycidyl-p-aminophenol | 30 parts by mass |
| EPIKOTE 152 (phenol novolac type epoxy resin: prepared by Japan Epoxy Resins Co., Ltd.) | 30 parts by mass |
| 1-benzyl-2-methylimidazole | 10 parts by mass |
| AEROSIL 200 silica particles (prepared by Nippon Aerosil Co., Ltd.; silica particles; primary particle diameter: 14 nm) | 2 parts by mass |

<Heating Conditions for Adhesive Agent C at Joining>
Heating temperature: 45° C.
Heating time: 13 hours
<Jetting Test>
A jetting test was performed for the constituted inkjet head by using dummy ink for jetting evaluation, which does not contain colorant. Composition of the dummy ink is as follows.

| | |
|---|---|
| butoxyethyl acetate | 50 parts by mass |
| dimethylformamide (SP = 12.1, dipole moment = 3.86) | 50 parts by mass |

A difference between the maximum jetting speed and the minimum jetting speed in the nozzles was 7%, and uniformity of the jetting speed was satisfactory. Moreover, after the ink was filled in the inkjet head and was left for one week at 60° C., for two weeks at 60° C., and for one month at 60° C., the jetting was performed. As a result, there was no ink leakage in any of the cases.

Next, inkjet heads were constituted while replacing the adhesive agent C by the following adhesive agents D to H, and the jetting test was performed.
<Composition of Adhesive Agent D (Comparative Example)>

| | |
|---|---|
| EPIKOTE 807 (bisphenol F; epoxy equivalent: 165; prepared by Japan Epoxy Resins Co., Ltd.) | 100 parts by mass |
| 2-ethyl-4-methylimidazole | 10 parts by mass |

The adhesive agent D was cured under similar heating conditions to those of the adhesive agent C, and was left for one week at 60° C., and then the jetting test was formed. As a result, ink leakage occurred. Then, the curing was performed while changing the temperature to 70° C., and as a result, a difference between the maximum jetting speed and the minimum jetting speed in the jetting test was 18%, which was problematic in uniformity.
<Composition of Adhesive Agent E (Present Invention)>

| | |
|---|---|
| EPIKOTE 807 (bisphenol F; epoxy equivalent: 165; prepared by Japan Epoxy Resins Co., Ltd.) | 70 parts by mass |
| triglycidyl-p-aminophenol | 30 parts by mass |
| 1-isobutyl-2-mehylimidazole | 10 parts by mass |
| AEROSIL 200 silica particles (prepared by Nippon Aerosil Co., Ltd.; silica particles; primary particle diameter: 14 nm) | 2 parts by mass |

<Heating Conditions for Adhesive Agent E at Joining>
Heating temperature: 45° C.
Heating time: 13 hours
A jetting test was performed similarly to the case of the adhesive agent C. A difference between the maximum jetting speed and the minimum jetting speed in the nozzles was 6%, and uniformity of the jetting speed was substantially satisfactory. Moreover, after the ink was filled in the inkjet head and was left for one month at 60° C., the jetting was performed. As a result, there was no ink leakage.
<Composition of Adhesive Agent F (Present Invention)>

| | |
|---|---|
| EPIKOTE 807 (bisphenol F; epoxy equivalent: 165; prepared by Japan Epoxy Resins Co., Ltd.) | 50 parts by mass |
| tetraglycidyl diaminodiphenyl methane (epoxy equivalent: 105.5) | 50 parts by mass |
| 1-benzylimidazole | 10 parts by mass |
| AEROSIL 200 silica particles (prepared by Nippon Aerosil Co., Ltd.; silica particles; primary particle diameter: 14 nm) | 2 parts by mass |

<Heating Conditions for Adhesive Agent F at Joining>
Heating temperature: 45° C.
Heating time: 13 hours
A jetting test was performed similarly to the case of the adhesive agent C. A difference between the maximum jetting speed and the minimum jetting speed in the nozzles was 8%, and uniformity of the jetting speed was substantially satisfactory. Moreover, after the ink was filled in the inkjet head and was left for three weeks at 60° C., the jetting was performed. As a result, leakage occurred.

<Composition of Adhesive Agent G (Comparative Example)>

| | |
|---|---|
| EPIKOTE 807 (bisphenol F; epoxy equivalent: 165; prepared by Japan Epoxy Resins Co., Ltd.) | 70 parts by mass |
| triglycidyl-p-aminophenol | 30 parts by mass |
| 2-methylimidazole | 10 parts by mass |
| AEROSIL 200 silica particles (prepared by Nippon Aerosil Co., Ltd.; silica particles; primary particle diameter: 14 nm) | 2 parts by mass |

<Heating Conditions for Adhesive Agent G at Joining>
Heating temperature: 45° C.
Heating time: 13 hours A jetting test was performed similarly to the case of the adhesive agent C. A difference between the maximum jetting speed and the minimum jetting speed in the nozzles was 8%, and uniformity of the jetting speed was substantially satisfactory. However, after the ink was filled in the inkjet head and was left for one week at 60° C., the jetting was performed. As a result, leakage occurred. Next, the curing was performed while changing the temperature to 70° C., and as a result, such a distribution of the jetting speed became 19%, which was problematic in uniformity.

<Composition of Adhesive Agent H (Comparative Example)>

| | |
|---|---|
| EPIKOTE 828 (bisphenol A type epoxy resin; epoxy equivalent: 190; prepared by Japan Epoxy Resins Co., Ltd.) | 70 parts by mass |
| triglycidyl-p-aminophenol | 30 parts by mass |
| 2-methylimidazole triethylene | 10 parts by mass |
| AEROSIL 200 silica particles (prepared by Nippon Aerosil Co., Ltd.; silica particles; primary particle diameter: 14 nm) | 2 parts by mass |
| triethylene tetramine | 9 parts by mass |
| AEROSIL 200 silica particles (prepared by Nippon Aerosil Co., Ltd.; silica particles; primary particle diameter: 14 nm) | 2 parts by mass |

<Heating Conditions for Adhesive Agent H at Joining>
Heating temperature: 45° C.
Heating time: 13 hours When the adhered portion was touched after the heating, stickiness remained, and the adhesive agent was not completely cured. Next, heating was performed at 70° C. for 13 hours. As a result, a difference between the maximum jetting speed and the minimum jetting speed in the nozzles was 15%, which was problematic in uniformity. Moreover, after the ink was filled in the inkjet head and was left for two weeks at 60° C., the jetting was performed. As a result, leakage occurred.

Results of Example 3 are shown in Table 3.

TABLE 3

| | ADHESIVE AGENT | | | | EVALUATION | | |
|---|---|---|---|---|---|---|---|
| | ADHESIVE AGENT | COMPOSITION (PARTS BY MASS) | | | CURING CONDITION | INK LEAKAGEAGE TEST | JETTING SPEED DISTRIBUTION |
| | | BASE | | ACTIVATOR | | | |
| INVENTIVE | C | E7 (40) | E4 (30) E3 (30) | Z1 (10) | 45° C. 13 H | NO INK LEAKAGEAGE AFTER 4 WEEKS | UNIFORM |
| COMPARATIVE | D | E7 (100) | — — | Z6 (10) | 45° C. 13 H | INK LEAKAGEAGE OCCURRED | — |
| COMPARATIVE | | | | | 70° C. 13 H | NO INK LEAKAGEAGE | NONUNIFORM |
| INVENTIVE | E | E7 (70) | E4 (30) — | Z7 (10) | 45° C. 13 H | NO INK LEAKAGEAGE AFTER 4 WEEKS | UNIFORM |
| INVENTIVE | F | E7 (50) | E5 (50) — | Z8 (10) | 45° C. 13 H | NO INK LEAKAGEAGE AFTER 2 WEEKS | UNIFORM |
| COMPARATIVE | G | E7 (70) | E4 (30) — | Z9 (10) | 45° C. 13 H | INK LEAKAGEAGE OCCURRED AFTER 1 WEEK | UNIFORM |
| COMPARATIVE | | | | | 70° C. 13 H | NO INK LEAKAGEAGE | NONUNIFORM |
| COMPARATIVE | H | E1 (70) | E4 (30) — | Z10 (9) | 45° C. 13 H | NOT MEASURABLE DUE TO BRAKEAGE | — |
| COMPARATIVE | | | | | 70° C. 13 H | INK LEAKAGEAGE OCCURRED AFTER 2 WEEKS | NONUNIFORM |

Here, compounds in Table 3 are as follows
E1: EPIKOTE 828 (bisphenol A type epoxy resin (a compound having two epoxy groups))
E3: EPIKOTE 152 (phenol novolac type epoxy resin (a compound having three or more epoxy groups))
E4: triglycidyl-p-aminophenol (a compound having three or more epoxy groups)
E5: tetraglycidyl diaminodiphenyl methane (a compound having three or more epoxy groups)
E7: EPIKOTE 807 (bisphenol F type epoxy resin (a compound having two epoxy groups))
Z1: 1-benzyl-2-methylimidazole (an imidazole-series activator according to the present invention)
Z6: 2-ethyl-4-methylimidazole (an imidazole-series activator out of the present invention)
Z7: 1-isobutyl-2-methylimidazole (an imidazole-series activator according to the present invention)
Z8: 1-benzylimidazole (an imidazole-series activator according to the present invention)
Z9: 2-methylimidazole (an imidazole-series activator out of the present invention)
Z10: triethylene tetramine (an imidazole-series activator out of the present invention)

From Table 3, it is understood that, in the case of using the imidazole-series activator according to the present invention, the curing at 60° C. or less is possible, and in addition, the ink leakage is less prone to occur, and the excellent solvent resistance is brought. Moreover, in the case of using the compound having three or more epoxy groups, which is expressed by the above-described general formula (2), the ink leakage is further less prone to occur, and the solvent resistance is further enhanced. Moreover, the members of which linear thermal expansion coefficients have the difference exceeding 12 ppm/K can be adhered together, and the inkjet head can be easily manufactured by using the manifold with a linear thermal expansion coefficient of 50 ppm/K.

Example 4

A similar test to that of Example 3 was performed except that ink made only of N-methylpyrrolidinone (SP=11.3, dipole moment=4.09) was prepared and used. However, with regard to the heating conditions, the heating temperature was set at 55° C., and the heating time was set at three hours.

Adhesive Agent C: Present Invention

A difference between the maximum jetting speed and the minimum jetting speed in the nozzles was 8%, and uniformity of the jetting speed was substantially satisfactory. The ink was filled in the inkjet head and was left for one month at 60° C., and the jetting was performed. As a result, there was no ink leakage.

Adhesive Agent D: Comparative Example

The ink was filled in the inkjet head and was left for one week at 60° C., and the jetting was performed. As a result, ink leakage occurred.

Adhesive Agent E: Present Invention

A difference between the maximum jetting speed and the minimum jetting speed in the nozzles was 9%, and uniformity of the jetting speed was substantially satisfactory. After the ink was filled in the inkjet head and was left for one month at 60° C., the jetting was performed. As a result, there was no ink leakage.

Adhesive Agent F: Present Invention

After the ink was filled in the inkjet head and was left for two weeks at 60° C., the jetting was performed. As a result, no ink leakage occurred. However, when the jetting was performed after the ink filled in the inkjet head was left for three weeks at 60° C., ink leakage occurred. The uniformity of jetting speed is considerably good.

Adhesive Agent G: Comparative Example

After the ink was filled in the inkjet head and was left for one week at 60° C., the jetting was performed. As a result, ink leakage occurred.

Adhesive Agent H: Comparative Example

When the adhered portion was touched after the heating, stickiness remained, and the adhesive agent was not completely cured. However, the ink was filled as it was in the inkjet head and was left for one week at 60° C., and the jetting was then performed. As a result ink leakage occurred.

Results of Example 4 are shown in Table 4.

From Table 4, it is understood that, in the case of using the imidazole-series activator according to the present invention, the curing at 60° C. or less is possible, and in addition, ink leakage is less prone to occur even if N-methylpyrrolidone having strong resin dissolving power is jetted as a substitution for the ink, and excellent solvent resistance is brought. Moreover, it is understood that, in the case of using the compound having three or more epoxy groups, which is expressed by the above-described general formula (2), the ink leakage is further less prone to occur, and the solvent resistance is further enhanced.

Example 5

PZT (thickness: 700 µm; Curie temperature: 210° C.; linear thermal expansion coefficient: 4 ppm/K) and PZT (thickness: 150 µm; Curie temperature: 210° C.; linear thermal expansion coefficient: 4 ppm/K) were adhered to each other so that the polarization directions thereof could be reverse to each other by using an adhesive agent I according to the present invention, which will be described as below. In such a way, a piezoelectric ceramic base was formed. Subsequently, concave portions with a depth of 300 µm and a width of 70 µm were formed from the thinner PZT side as shown in FIG. 3. Then, aluminum was deposited on side surfaces of the concave portions, and electrode layers were formed. As shown in FIG. 4A, a cap member (AlN with a thickness of 700 µm, linear thermal expansion coefficient: 4 ppm/K) was joined to a joined member of the PZTs of the piezoelectric ceramic base by using the adhesive agent I, and by a CVD method, poly-p-xylylene was coated thereon as an insulating layer. Thereafter, a body thus obtained was cut along the direction perpendicular to the length direction of the concave portions, and a head chamber was thus formed (refer to FIG. 5). Onto the head chamber, a nozzle plate (one in which nozzle holes with a diameter of 30 µm are formed in polyimide with a thickness of 100 µm) was joined by using the adhesive agent

TABLE 4

| | ADHESIVE AGENT | | | | EVALUATION | |
|---|---|---|---|---|---|---|
| | | COMPOSITION (PARTS BY MASS) | | | | JETTING SPEED |
| ADHESIVE | | | | CURING | | |
| AGENT | | BASE | | ACTIVATOR | CONDITION | INK LEAKAGE TEST | DISTRIBUTION |
| INVENTIVE | C | E7 (40) | E4 (30) E3 (30) | Z1 (10) | 55° C. 3 H | NO INK LEAKAGE AFTER 4 WEEKS | UNIFORM |
| COMPARATIVE | D | E7 (100) | — — | Z6 (10) | 55° C. 3 H | INK LEAKAGE OCCURRED AFTER 1 WEEKS | — |
| INVENTIVE | E | E7 (70) | E4 (30) — | Z7 (10) | 55° C. 3 H | NO INK LEAKAGE AFTER 4 WEEKS | UNIFORM |
| INVENTIVE | F | E7 (50) | E5 (50) — | Z8 (10) | 55° C. 3 H | NO INK LEAKAGE AFTER 2 WEEKS | UNIFORM |
| COMPARATIVE | G | E7 (70) | E4 (30) — | Z9 (10) | 55° C. 3 H | INK LEAKAGE OCCURRED AFTER 1 WEEKS | — |
| COMPARATIVE | H | E1 (70) | E4 (30) — | Z10 (9) | 55° C. 3 H | NO CURING | — |

Here, compounds in Table 4 are as follows.
E1: EPIKOTE 828 (bisphenol A type epoxy resin (a compound having two epoxy groups))
E3: EPIKOTE 152 (phenol novolac type epoxy resin (a compound having three or more epoxy groups))
E4: triglycidyl-p-aminophenol (a compound having three or more epoxy groups)
E5: tetraglycidyl diaminodiphenyl methane (a compound having three or more epoxy groups)
E7: EPIKOTE 807 (bisphenol F type epoxy resin (a compound having two epoxy groups))
Z1: 1-benzyl-2-methylimidazole (an imidazole-series activator according to the present invention)
Z6: 2-ethyl-4-methylimidazole (an imidazole-series activator out of the present invention)
Z7: 1-isobutyl-2-methylimidazole (an imidazole-series activator according to the present invention)
Z8: 1-benzylimidazole (an imidazole-series activator according to the present invention)
Z9: 2-methylimidazole (an imidazole-series activator out of the present invention)
Z10: triethylene tetramine (an imidazole-series activator out of the present invention)

I (refer to FIG. 6). Thereafter, as shown in FIG. 6, an electrode was drawn out, and a manifold (made of AlN/BN, linear thermal expansion coefficient: 5 ppm/K) was adhered by using the adhesive agent I, followed by curing. Subsequently, a cover made of aluminum die cast (linear thermal expansion coefficient: 20 ppm/K) was attached so as to surround the piezoelectric ceramic base and the cap member. Then, the adhesive agent I was injected between the cover and the piezoelectric ceramic base and between the cover and the cap member, and the respective members were joined together.

<Composition of Adhesive Agent I>

| | |
|---|---|
| EPIKOTE 807 (bisphenol F; epoxy equivalent: 165; prepared by Japan Epoxy Resins Co., Ltd.) | 70 parts by mass |
| triglycidyl-p-aminophenol | 30 parts by mass |
| 1,2-dimethylimidazole | 10 parts by mass |
| AEROSIL 200 silica particles (prepared by Nippon Aerosil Co., Ltd.; silica particles; primary particle diameter: 14 nm) | 2 parts by mass |

<Heating Conditions for Adhesive Agent I at Joining>
Heating temperature: 45° C.
Heating time: 13 hours <Jetting Test>
A jetting test was performed for the constituted inkjet head by using dummy ink for jetting evaluation, which does not contain colorant. Composition of the dummy ink is as follows.

| | |
|---|---|
| butoxyethyl acetate | 50 parts by mass |
| dimethylformamide (SP = 12.1, dipole moment = 3.86) | 50 parts by mass |

A difference between the maximum jetting speed and the minimum jetting speed in the nozzles was 5%, and uniformity of the jetting speed was satisfactory. Moreover, after the ink was filled in the inkjet head and was left for four weeks at 60° C., the jetting was performed. As a result, there was no ink leakage.

Next, as a comparative example, the adhesive agent I was replaced by the following adhesive agent J, and the adhesive agent J was cured under heating conditions similar to the above. When the ink was jetted after the ink was filled in the inkjet head and was left for one week at 60° C., ink leakage occurred. Then, the curing was performed while changing the curing temperature to 70° C. As a result, though no ink leakage occurred ever after the ink was jetted after being left for three weeks at 60° C., a difference between the maximum jetting speed and the minimum jetting speed was 15%, which was problematic in uniformity.

<Composition of Adhesive Agent J>

| | |
|---|---|
| EPIKOTE 807 (bisphenol F; epoxy equivalent: 165; prepared by Japan Epoxy Resins Co., Ltd.) | 70 parts by mass |
| triglycidyl-p-aminophenol | 30 parts by mass |
| 2-phenylimidazole | 10 parts by mass |
| AEROSIL 200 silica particles (prepared by Nippon Aerosil Co., Ltd.; silica particles; primary particle diameter: 14 nm) | 2 parts by mass |

Results of Example 5 are shown in Table 5.

TABLE 5

| | ADHESIVE AGENT | | | | EVALUATION | |
|---|---|---|---|---|---|---|
| | | COMPOSITION (PARTS BY MASS) | | CURING | | JETTING SPEED |
| ADHESIVE | AGENT | BASE | ACTIVATOR | CONDITION | INK LEAKAGE TEST | DISTRIBUTION |
| INVENTIVE | I | E7 (70) E4 (30) | Z11 (10) | 45° C. 13 H | NO INK LEAKAGE AFTER 4 WEEKS | UNIFORM |
| COMPARATIVE | J | E7 (70) E4 (30) | Z12 (10) | 45° C. 13 H | INK LEAKAGE OCCURRED AFTER 1 WEEK | — |
| COMPARATIVE | | | | 70° C. 13 H | NO INK LEAKAGE AFTER 3 WEEKS | NONUNIFORM |

Here, compounds in Table 5 are as follows.
E4: triglycidyl-p-aminophenol (a compound having three or more epoxy groups)
E7: EPIKOTE 807 (bisphenol F type epoxy resin (a compound having two epoxy groups)
Z11: 1,2-dimethyl-p-aminophenol (imidazole-series activator according to the present invention)
Z12: 2-phenylimidazole (imidazole-series activator out of the present invention)

From Table 5, the following is understood. When the adhesive agent to which the imidazole-series activator out of the present invention is added is used, even in the case where the members of which linear thermal expansion coefficients have a small difference are adhered to each other, ink leakage occurred, and the jetting speed became nonuniform. As opposed to this, when the adhesive agent to which the imidazole-series activator of the present invention is added is used, the ink leakage is less prone to occur, and the distribution of the jetting speed also became uniform, thus making it possible to enhance the solvent resistance and the jetting performance.

Example 6

(1.1) Preparation of Samples 1 to 13

The bases and the activators were mixed together (the microparticles of resin, the silane coupling agents, and zirconate were also mixed arbitrarily). Mixtures thus obtained were prepared into particulates with a mass of 0.1 to 0.2 g per droplet, and the particulates wee dropped on a Teflon (registered trademark) sheet. Thereafter, the respective dropped particulates were cured by being left for 20 hours at 45° C., pellets of adhesive agents K to W were thus prepared, and these pellets were named "Samples 1 to 13". Compositions (existences and types of the bases, the activators, the microparticles of resin, the silane coupling agents, and zirconate) of the respective adhesive agents K to W are as shown in the following Table 6.

(1.2) Measurement of Mass Increase Rates of Samples 1 to 13

After preparing Samples 1 to 13, masses of the respective Samples 1 to 13 were measured, and the respective Samples 1 t 13 were immersed in a solvent (N-methylpyrrolidone), and were left for seven days at 60° C. After seven days, the respective Samples 1 to 13 were taken out of the solvent and were washed by isopropyl alcohol in a wash bottle. After the washing, the isopropyl alcohol attached to the surfaces of the respective Samples 1 to 13 was removed, and the masses of the respective Samples 1 to 13 were measured again.

After the remeasurement of the masses, the mass increase rates of the respective Samples 1 to 13 were calculated according to the following expression. Results of the calculations are as shown in the following Table 6.

mass increase rate (%)=((mass after immersion into solvent)−(mass before immersion into solvent))/ (mass before immersion into solvent)

that the polarization directions thereof could be reverse to each other by an adhesive agent. When the first PZT substrate and the second PZT substrate were adhered to each other, EPO-TEK 353 ND (prepared by Rikei Corporation) was used as the adhesive agent, heat of 80 to 100° C. was added to the adhesive agent concerned, and the adhesive agent concerned was cured.

After the first and second PZT substrates were adhered to each other, channels (grooves) with a depth of 300 μm and a width of 70 μm were formed from the first PZT substrate to the second PZT substrate, aluminum was deposited on inner walls of the channels, and electrode layers made of aluminum were thus formed in the inside of the channels.

After the electrode layers were formed, a cover plate (made of aluminum nitride with a thickness of 700 μm; linear thermal expansion coefficient: 4 ppm/K) was adhered onto the first PZT substrate by an adhesive agent (refer to FIGS. 4A and 4B). When the cover plate and the first PZT substrate were adhered to each other, EPO-TEK 353 ND (prepared by Rikei Corporation) was used as the adhesive agent, heat of 80

TABLE 6

| | SAMPLE NO. | ADHESIVE AGENT | ADHESIVE AGENT COMPOSITION (PARTS BY MASS) | | | | | MASS RATE OF INCREASE (%) |
|---|---|---|---|---|---|---|---|---|
| | | | BASE | | | ACTIVATOR | ADDITIVE | |
| INVENTIVE | 1 | K | E1 (60) | E3 (10) | E4 (30) | Z1 (10) | — | 7.4 |
| INVENTIVE | 2 | L | E2 (60) | E3 (10) | E4 (30) | Z1 (10) | — | 3 |
| INVENTIVE | 3 | M | E2 (60) | E3 (10) | E4 (30) | Z1 (10) | A (3) | 3.7 |
| INVENTIVE | 4 | N | E2 (60) | E3 (10) | E4 (30) | Z1 (10) | B (3) | 3.4 |
| INVENTIVE | 5 | O | E2 (60) | E3 (10) | E4 (30) | Z1 (10) | C (3) | 3.4 |
| INVENTIVE | 6 | P | E1 (60) | E3 (10) | E4 (30) | Z1 (10) | A (3) | 7.6 |
| INVENTIVE | 7 | Q | E1 (60) | E3 (10) | E4 (30) | Z1 (10) | B (3) | 7.3 |
| INVENTIVE | 8 | R | E1 (60) | E3 (10) | E4 (30) | Z1 (10) | C (3) | 7.4 |
| INVENTIVE | 9 | S | — | — | E4 (100) | Z1 (10) | — | 1.5 |
| INVENTIVE | 10 | T | E2 (60) | E3 (10) | E4 (30) | Z1 (7) | — | 3.7 |
| INVENTIVE | 11 | U | E2 (60) | E3 (10) | E4 (30) | Z1 (5) | — | 8.6 |
| COMPARATIVE | 12 | V | E2 (100) | — | — | Z1 (10) | — | 12.8 |
| COMPARATIVE | 13 | W | E1 (70) | — | E4 (30) | Z13 (10) | — | 13.1 |

Here, compounds in Table 6 are as follows.
E1: EPIKOTE 828 (bisphenol A type epoxy resin (a compound having two epoxy groups))
E2: EPIKOTE 806 (bisphenol F type epoxy resin (a compound having two epoxy groups))
E3: EPIKOTE 152 (phenol novolac type epoxy resin (a compound having three or more epoxy groups))
E4: triglycidyl-p-aminophenol (a compound having three or more epoxy groups)
Z1: 1-benzyl-2-methylimidazole (imidazole-series activator according to the present invention)
Z13: 2,4-dimethylimidazole (imidazole-series activator out of the present invention)
A: copolymer particles of methyl methacrylate and butyl acrylate (microparticles of resin; mean particle diameter: approximately 0.3 μm)
B: γ-glycidoxy propyl trimethoxy silane (silane coupling agent)
C: isopropyltri(n-aminoethyl-aminoethyl)zirconate (zirconate)

From Table 6, the following is understood. Mass change rates of Samples 1 to 11 were lower than those of Samples 12 and 13, and the adhesive agents K to U are less prone to be dissolved into the solvent. In the case of using the imidazole-series activator according to the present invention, the solvent resistance is enhanced. Moreover, the bisphenol F type epoxy resin as a compound having two epoxy groups is contained as the main material, thus making it possible to further decrease the mass increase rates, and to further enhance the solvent resistance.

Example 7

(2.1) Preparation of Samples 1 to 13

Two PZT substrates were prepared, which are: "a first PZT substrate (thickness: 150 μm; Curie temperature: 210° C.; linear thermal expansion coefficient: 4 ppm/K)"; and "a second PZT substrate (thickness: 700 μm; Curie temperature: 210° C.; linear thermal expansion coefficient: 4 ppm/K)". The first and second PZT substrates were adhered to each other so to 100° C. was added to the adhesive agent concerned, and the adhesive agent concerned was cured.

After the cover plate was adhered, the inner walls of the electrode layers underwent the poly-p-xylylene treatment by the CVD method, and protection layers were formed in the inside of the channels. After the protection layers were formed, the first and second PZT substrates and the cover plate were cut along the direction perpendicular to the length direction of the channels, and a head chip was manufactured (refer to FIG. 5).

After the head chip was manufactured, a nozzle plate (one in which jetting holes with a diameter of 30 μm are formed in polyimide with a thickness of 100 μm) was adhered thereto by an adhesive agent. When the cover plate and the head chip (first PZT substrate) were adhered to each other, EPO-TEK 353 ND (prepared by Rikei Corporation) was used as the adhesive agent, heat of 80 to 100° C. was added to the adhesive agent concerned, and the adhesive agent concerned was cured.

After the nozzle plate was adhered, other members such as a manifold (made of polyamide; linear thermal expansion coefficient: 50 ppm/K) were adhered to the head chip by an adhesive agent, and the inkjet head was manufactured. In this Example 2, in the adhesion of the manifold (adhesion of the manifold and the cover plate and adhesion of the manifold and the first PZT substrate), 13 types of adhesive agents shown in the following Table 7 were applied. Heat of 40° C. was added to the respective adhesive agents concerned, and the respective adhesive agents concerned were cured. Then, totally 13 types of inkjet heads corresponding to the types of adhesive agents were manufactured, and these inkjet heads were named "Samples 1 to 13".

(2.2) Evaluation of Samples 1 to 13
(2.2.1) Jetting Test

As a substitution for the ink, a mixture of 90 parts by mass of butoxyethyl acetate and 10 parts by mass of 2-pyrrolidinone was applied, the mixture concerned kept on being jetted from the respective Samples 1 to 13, and jetting performances (when ink leakage occurred) of the respective Samples 1 to 13 were evaluated. Results of the evaluations are shown in the following Table 7.

(2.2.2) Heat Cycle Test

As a heat cycle test at the first time, the above-described ink substitution was filled in the respective Samples 1 to 13, and the respective Samples 1 to 13 were put in a heat cycle environment of three cycles each of which was 25° C., (60° C., one hour), (25° C., 30 minutes), (0° C., one hour), (25° C., 30 minutes) in this order. Thereafter, the ink substitution was purged from the Samples 1 to 13, the channels of the respective Samples 1 to 13 were decompressed, and it was confirmed whether or not there was air leakage in the channels.

Thereafter, as a heat cycle test at the second time, further, the ink substitution was filled in the respective Samples 1 to 13, and the respective Samples 1 to 13 were put in a heat cycle environment of three cycles each of which was 25° C., (60° C., one hour), (25° C., 30 minutes), (−20° C., one hour), (25° C., 30 minutes) in this order. Thereafter, the ink substitution was purged from the respective Samples 1 to 13, the channels of the respective Samples 1 to 13 were decompressed, and it was confirmed whether or not there was air leakage in the channels.

Results of the tests are as shown in the following Table 7. Evaluation criteria of the heat cycle tests are as follows.

"No leakage" . . . There was no air leakage in both of the heat cycle tests at the first and second times.

"Leakage occurred at second test" . . . Although there was no air leakage in the heat cycle test at the first time, air leakage occurred in the heat cycle test at the second time.

"Slight leakage occurred at first test" . . . Some air leakage occurred in the heat cycle test at the first time.

"Leakage occurred at first test" . . . Air leakage occurred in the heat cycle test at the first time.

(2.2.3) Observation of Existence of Crack

For each of the respective Samples 1 to 13, it was visually observed whether or not there was a crack in the adhesive agent between the cover plate and the manifold after the above-described heat cycle tests. Results of the observations are shown in the following Table 7. Evaluation criteria of the crack are as follows.

"No crack" . . . There was no crack.
"A few cracks" . . . One or two cracks were observed.
"Cracks" . . . Three or more cracks were observed.

TABLE 7

| | SAMPLE NO. | ADHESIVE AGENT | ADHESIVE AGENT COMPOSITION (PARTS BY MASS) | | | |
| --- | --- | --- | --- | --- | --- | --- |
| | | | BASE | | ACTIVATOR | ADDITIVE |
| INVENTIVE | 1 | K | E1 (60) | E3 (10) | E4 (30) | Z1 (10) | — |
| INVENTIVE | 2 | L | E2 (60) | E3 (10) | E4 (30) | Z1 (10) | — |
| INVENTIVE | 3 | M | E2 (60) | E3 (10) | E4 (30) | Z1 (10) | A (3) |
| INVENTIVE | 4 | N | E2 (60) | E3 (10) | E4 (30) | Z1 (10) | B (3) |
| INVENTIVE | 5 | O | E2 (60) | E3 (10) | E4 (30) | Z1 (10) | C (3) |
| INVENTIVE | 6 | P | E1 (60) | E3 (10) | E4 (30) | Z1 (10) | A (3) |
| INVENTIVE | 7 | Q | E1 (60) | E3 (10) | E4 (30) | Z1 (10) | B (3) |
| INVENTIVE | 8 | R | E1 (60) | E3 (10) | E4 (30) | Z1 (10) | C (3) |
| INVENTIVE | 9 | S | — | — | E4 (100) | Z1 (10) | — |
| INVENTIVE | 10 | T | E2 (60) | E3 (10) | E4 (30) | Z1 (7) | — |
| INVENTIVE | 11 | U | E2 (60) | E3 (10) | E4 (30) | Z1 (5) | — |
| COMPARATIVE | 12 | V | E2 (100) | — | — | Z1 (10) | — |
| COMPARATIVE | 13 | W | E1 (70) | — | E4 (30) | Z13 (10) | — |

| | SAMPLE NO. | CURING CONDITION | EVALUATION | | |
| --- | --- | --- | --- | --- | --- |
| | | | INK LEAKAGE TEST | HEAT CYCLE TEST | CRACK |
| INVENTIVE | 1 | 40° C. 20 H | NO INK LEAKAGE AFTER 2 WEEKS | SLIGHT LEAKAGE OCCURRED AT FIRST TEST | A FEW CRACKS |
| INVENTIVE | 2 | 40° C. 20 H | NO INK LEAKAGE AFTER 4 WEEKS | LEAKAGE OCCURRED AT SECOND TEST | NO CRACK |
| INVENTIVE | 3 | 40° C. 20 H | NO INK LEAKAGE AFTER 4 WEEKS | NO LEAKAGE | NO CRACK |
| INVENTIVE | 4 | 40° C. 20 H | NO INK LEAKAGE AFTER 4 WEEKS | NO LEAKAGE | NO CRACK |
| INVENTIVE | 5 | 40° C. 20 H | NO INK LEAKAGE AFTER 4 WEEKS | NO LEAKAGE | NO CRACK |
| INVENTIVE | 6 | 40° C. 20 H | NO INK LEAKAGE AFTER 4 WEEKS | NO LEAKAGE | NO CRACK |

TABLE 7-continued

| | | | | | |
|---|---|---|---|---|---|
| INVENTIVE | 7 | 40° C. 20 H | NO INK LEAKAGE AFTER 4 WEEKS | NO LEAKAGE | NO CRACK |
| INVENTIVE | 8 | 40° C. 20 H | NO INK LEAKAGE AFTER 4 WEEKS | NO LEAKAGE | NO CRACK |
| INVENTIVE | 9 | 40° C. 20 H | NO INK LEAKAGE AFTER 3 WEEKS | SLIGHT LEAKAGE OCCURRED AT FIRST TEST | A FEW CRACKS |
| INVENTIVE | 10 | 40° C. 20 H | NO INK LEAKAGE AFTER 4 WEEKS | LEAKAGE OCCURRED AT SECOND TEST | NO CRACK |
| INVENTIVE | 11 | 40° C. 20 H | NO INK LEAKAGE AFTER 2 WEEKS | SLIGHT LEAKAGE OCCURRED AT FIRST TEST | A FEW CRACKS |
| COMPARATIVE | 12 | 40° C. 20 H | INK LEAKAGE OCCURRED AFTER 1 WEEK | LEAKAGE OCCURRED AT FIRST TEST | CRACKS |
| COMPARATIVE | 13 | 40° C. 20 H | INK LEAKAGE OCCURRED AFTER 1 WEEK | LEAKAGE OCCURRED AT FIRST TEST | CRACKS |

Here, compounds in Table 7 are as follows.
E1: EPIKOTE 828 (bisphenol A type epoxy resin (a compound having two epoxy groups))
E2: EPIKOTE 806 (bisphenol F type epoxy resin (a compound having two epoxy groups))
E3: EPIKOTE 152 (phenol novolac type epoxy resin (a compound having three or more epoxy groups))
E4: triglycidyl-p-aminophenol (a compound having three or more epoxy groups)
Z1: 1-benzyl-2-methylimidazole (imidazole-series activator according to the present invention)
Z13: 2,4-dimethylimidazole (imidazole-series activator out of the present invention)
A: copolymer particles of methylmethacrylate and butyl acrylate (microparticles of resin; mean particle diameter: approximately 0.3 μm)
B: γ-glycidoxy propyl trimethoxy silane (silane coupling agent)
C: isopropyltri(n-aminoethyl-aminoethyl)zirconate (zirconate)

From Table 7, it is understood that results of Samples 1 to 11 were better than results of Samples 12 and 13. In particular, from the jetting test and the heat cycle test, it is understood that there was no crack, deflection, exfoliation, or the like in the adhesive agent at the joint of the manifold. From the above, it is understood that the adhesive agents with such specific compositions, such as the adhesive agents K to U, can be cured by heat of 60° C. and have flexibility. Moreover, it is understood that the adhesive agents as described above effectively function to prevent the crack, deflection, exfoliation, and the like of the members. Moreover, by adding at least one of the microparticles of resin, the silane coupling agent, and zirconate to the adhesive agents, the adhesive agents can obtain good results in the ink leakage test and the heat cycle test, can have higher solvent resistance, can be cured at the low temperature, and can have flexibility.

The entire disclosure of Japanese Patent Application Nos. 2005-79552 filed on Mar. 18; 2005-347811 filed on Dec. 1, 2005; 2005-79570 filed on Mar. 18, 2005; 2005-364691 filed on Dec. 19, 2005; and 2006-036571 filed on Feb. 14, 2006 including description, claims, drawings and summary respectively are incorporated herein by reference.

What is claimed is:

1. A method of manufacturing an inkjet head, comprising:
preparing a first member made of ceramic material and a second member made of resin material, the first member and the second member constituting the inkjet head and a difference in linear thermal expansion coefficient between the first member and the second member being 12 ppm/K or more,
adhering the first member and the second member together by using an adhesive agent composition,
wherein the adhesive agent composition contains, as an activator, an imidazole derivative in which an alkyl group or a substituted alkyl group is substituted at a 1-position or at 1- and 2-positions, contains a compound having three or more epoxy groups and a phenol novolac epoxy resin as a base, and is cured at 60° C. or less, thereby adhering the first member and the second member together.

2. The method of claim 1,
wherein the adhesive agent composition contacts ink after being cured.

3. The method of claim 1,
wherein, in the adhesive agent composition, the compound having three epoxy groups is a compound represented by a following general formula (2):

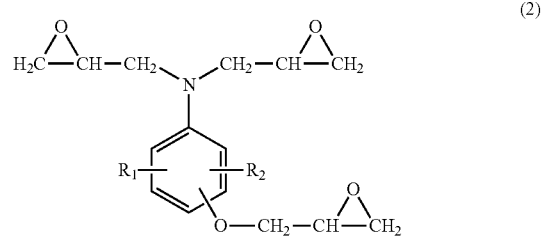

where $R_1$ and $R_2$ are hydrogen, an alkyl group, or a substituted alkyl group.

* * * * *